US012502320B2

(12) United States Patent
Emfinger et al.

(10) Patent No.: US 12,502,320 B2
(45) Date of Patent: Dec. 23, 2025

(54) SYSTEM TO ADJUST DRIVE OPERATION AND PERFORMANCE IN RESPONSE TO DETECTION OF A FRONT ADD-ON FOR A WHEELCHAIR

(71) Applicant: PERMOBIL, INC., Lebanon, TN (US)

(72) Inventors: William Alexander Emfinger, Nashville, TN (US); Benjamin William Gasser, Nashville, TN (US); Benjamin Phillip Hemkens, Nashville, TN (US)

(73) Assignee: PERMOBIL, INC., Lebanon, TN (US)

( * ) Notice: Subject to any disclaimer, the term of this patent is extended or adjusted under 35 U.S.C. 154(b) by 925 days.

(21) Appl. No.: 17/556,074

(22) Filed: Dec. 20, 2021

(65) Prior Publication Data

US 2023/0190548 A1 Jun. 22, 2023

(51) Int. Cl.

*A61G 5/04* (2013.01)
*A61G 5/02* (2006.01)
*A61G 5/10* (2006.01)

(52) U.S. Cl.

CPC ............. *A61G 5/047* (2013.01); *A61G 5/027* (2013.01); *A61G 5/045* (2013.01); *A61G 5/1005* (2013.01)

(58) Field of Classification Search

CPC ........ A61G 5/047; A61G 5/027; A61G 5/045; A61G 5/1005; A61G 5/1024; A61G 5/1032; A61G 5/1035; A61G 5/1051
USPC .............................................................. 180/13
See application file for complete search history.

(56) References Cited

U.S. PATENT DOCUMENTS

| | | | |
|---|---|---|---|
| 565,718 | A | 8/1896 | Boardman |
| 588,495 | A | 8/1897 | Smith |
| 1,794,796 | A | 3/1931 | Reichert et al. |
| 2,192,282 | A | 3/1940 | Warner |
| 2,448,992 | A | 9/1948 | Love et al. |
| 2,495,573 | A | 1/1950 | Duke |
| 2,548,274 | A | 4/1951 | Oeveren |
| 2,978,053 | A | 4/1961 | Schmidt |
| 3,794,132 | A | 2/1974 | Moon |

(Continued)

FOREIGN PATENT DOCUMENTS

| | | | |
|---|---|---|---|
| DE | 202015103690 | U1 | 7/2015 |
| DE | 202023103150 | U1 | 6/2023 |

(Continued)

OTHER PUBLICATIONS

T. Birmanns, EP 3173056 Machine English Translation, ip.com (Year: 2018).*

(Continued)

*Primary Examiner* — Karen Beck
(74) *Attorney, Agent, or Firm* — Michael Best & Friedrich LLP

(57) ABSTRACT

A wheelchair including a steering assembly configured to selectively attach to the wheelchair, the steering assembly including a steering member, a front wheel operably connected to the steering member, a frame assembly configured to carry the steering member and the front wheel, and a mounting assembly coupled to the frame assembly, and a drive assembly coupled to the wheelchair. The drive assembly is configured to operate in a first configuration in response to the steering assembly being detached from the wheelchair, and the drive assembly is configured to operate in a second configuration in response to the steering assembly being attached to the wheelchair.

25 Claims, 17 Drawing Sheets

(56) References Cited

U.S. PATENT DOCUMENTS

| | | | | |
|---|---|---|---|---|
| 3,912,032 | A | 10/1975 | Benz et al. | |
| 3,921,744 | A | 11/1975 | Benoit et al. | |
| 4,475,613 | A | 10/1984 | Walker | |
| 4,493,603 | A * | 1/1985 | Williams | A61G 3/06 414/921 |
| 4,503,925 | A | 3/1985 | Palmer et al. | |
| 4,592,563 | A | 6/1986 | Dean et al. | |
| 4,759,418 | A | 7/1988 | Goldenfeld et al. | |
| 5,016,720 | A * | 5/1991 | Coker | A61G 5/0825 74/105 |
| 5,135,063 | A | 8/1992 | Kropf | |
| 5,221,100 | A | 6/1993 | McNutt | |
| 5,509,674 | A | 4/1996 | Browning | |
| 5,651,422 | A | 7/1997 | Casali | |
| 5,899,475 | A | 5/1999 | Verhaeg et al. | |
| 6,766,871 | B2 | 7/2004 | Sawyer | |
| 7,140,621 | B2 | 11/2006 | Cheng | |
| 7,216,728 | B2 | 5/2007 | Huang et al. | |
| 8,079,604 | B2 | 12/2011 | Newton | |
| 9,302,730 | B2 | 4/2016 | Takenaka et al. | |
| 9,326,901 | B2 | 5/2016 | Conte | |
| 9,603,764 | B2 | 3/2017 | Turturro et al. | |
| 9,872,805 | B2 | 1/2018 | Bach Castillo | |
| 9,987,546 | B1 | 6/2018 | Clos et al. | |
| 9,993,378 | B2 | 6/2018 | Turturro et al. | |
| 10,112,675 | B2 | 10/2018 | Takenaka et al. | |
| 10,130,531 | B1 | 11/2018 | Laconis | |
| 10,238,952 | B2 | 3/2019 | Clos et al. | |
| 10,543,866 | B2 | 1/2020 | Araki et al. | |
| 10,583,888 | B2 | 3/2020 | Araki et al. | |
| 2005/0236194 | A1 | 10/2005 | Kidd et al. | |
| 2009/0066150 | A1 | 3/2009 | O'Rourke, Sr. | |
| 2011/0095508 | A1 | 4/2011 | Chiu | |
| 2011/0241301 | A1 * | 10/2011 | Duvivier | B62K 21/10 280/780 |
| 2011/0308880 | A1 | 12/2011 | Chiu | |
| 2013/0008732 | A1 * | 1/2013 | Richter | A61G 5/048 180/11 |
| 2014/0262575 | A1 | 9/2014 | Ritcher | |
| 2018/0147100 | A1 | 5/2018 | Conte | |
| 2019/0015272 | A1 | 1/2019 | Benedini | |
| 2019/0217915 | A1 | 7/2019 | Clos et al. | |
| 2020/0000657 | A1 | 1/2020 | Kim et al. | |
| 2020/0000658 | A1 | 1/2020 | Klein et al. | |
| 2020/0008990 | A1 | 1/2020 | Harrison | |

FOREIGN PATENT DOCUMENTS

| | | | | |
|---|---|---|---|---|
| DE | 202023103152 | U1 | 6/2023 | |
| EP | 0625434 | A1 | 11/1994 | |
| EP | 1927331 | A1 | 6/2008 | |
| EP | 1911428 | B1 | 6/2011 | |
| EP | 3053563 | A1 | 8/2016 | |
| EP | 3173056 | A1 * | 5/2017 | A61G 5/046 |
| EP | 3058922 | B1 | 12/2017 | |
| EP | 3415410 | A1 | 12/2018 | |
| EP | 3434244 | A1 | 1/2019 | |
| EP | 3501469 | A1 * | 6/2019 | A61G 5/027 |
| EP | 3622930 | A2 | 3/2020 | |
| EP | 3622931 | B1 | 4/2021 | |
| EP | 3501468 | B1 | 9/2021 | |
| ES | 2673174 | T3 * | 6/2018 | A61G 5/046 |
| JP | 2001340391 | A | 12/2001 | |
| JP | 2006167232 | A | 6/2006 | |
| WO | 02085645 | A1 | 10/2002 | |
| WO | 2017081475 | A1 | 5/2017 | |
| WO | 2017199116 | A1 | 11/2017 | |

OTHER PUBLICATIONS

International Search Report and Written Opinion for Application No. PCT/US2022/053355 dated Apr. 6, 2023 (13 pages).

Invitation to Pay Additional Fees for International Application No. PCT/US2022/053352 dated Apr. 18, 2023 (11 pages).

Invitation to Pay Additional Fees for International Application No. PCT/US2022/053350 dated Apr. 28, 2023 (10 pages).

International Search Report and Written Opinion for Application No. PCT/US2022/053350 dated Jul. 4, 2023 (19 pages).

International Search Report and Written Opinion for Application No. PCT/US2022/053352 dated Jul. 7, 2023 (19 pages).

* cited by examiner

SYSTEM TO ADJUST DRIVE OPERATION AND PERFORMANCE IN RESPONSE TO DETECTION OF A FRONT ADD-ON FOR A WHEELCHAIR

FIELD OF THE DISCLOSURE

The present disclosure relates to an add-on for a manual wheelchair. More specifically, the present disclosure relates to a removable steering assembly for the wheelchair that is operable by a user at the front of the wheelchair, and a system that selectively adjusts drive operation and performance in response to detection of the add-on.

BACKGROUND

Add-on hand bikes for a wheelchair are generally known in the art. These devices are motorized hand bikes that attach to a front of the wheelchair. Generally, these devices include a handlebar, a front wheel, and a motor all positioned in the add-on. As such, all of these components are in front of the wheelchair user. Unfortunately, these add-on hand bikes have substantial limitations. They are very heavy, because the motorization system, along with the handlebar and front wheel, are all integrated into the add-on. Accordingly, it can be very difficult for certain wheelchair users to manipulate, attached, and/or detach the hand bike from the front of the wheelchair. Add-on hand bikes can also have complex systems for mounting (or attaching) the hand bike to the wheelchair. This can be cumbersome for a wheelchair user to attach and detach the hand bike to the wheelchair. Accordingly, there is a need for an add-on that easily attaches and detaches to a wheelchair, while also providing improved drive system operation depending on whether the add-on is attached to or detached from the wheelchair.

SUMMARY

In one embodiment, a wheelchair includes a steering assembly configured to selectively attach to the wheelchair, the steering assembly including a steering member, a front wheel operably connected to the steering member, a frame assembly configured to carry the steering member and the front wheel, and a mounting assembly coupled to the frame assembly, and a drive assembly coupled to the wheelchair at a position between a pair of rear wheels of the wheelchair. The drive assembly is configured to operate in a first configuration in response to the steering assembly being detached from the wheelchair, and the drive assembly is configured to operate in a second configuration in response to the steering assembly being attached to the wheelchair.

In another embodiment, a wheelchair includes a drive assembly removably coupled to the wheelchair and a steering assembly that is configured to selectively attach to the wheelchair. The steering assembly includes a steering member, a front wheel operably connected to the steering member, a frame assembly configured to carry the steering member and the front wheel, a brake operably connected to the front wheel, at least one brake actuator operably connected to the brake, and a mounting assembly coupled to the frame assembly. In response to actuation of the brake actuator, the drive assembly is configured to temporarily disengage operation.

Other aspects of the disclosure will become apparent by consideration of the detailed description and accompanying drawings.

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

The present disclosure is directed to an embodiment of a steering assembly 100 that is configured to selectively attach (or selectively couple) to a wheelchair 10. The steering assembly 100 is configured to be positioned at a front of the wheelchair 10 for user operation. The steering assembly 100 selectively couples to a mounting member of the wheelchair 10, while also selectively electrically connecting to a motorized drive attached to the wheelchair 10. Thus, the steering assembly 100 can be used to operate the motorized drive, while also allowing the user to steer the wheelchair 10. The steering assembly 100 can also be attached to or detached from the wheelchair 10 as needed by the user of the wheelchair 10. The motorized drive can be configured to detect whether the steering assembly 100 is attached to the wheelchair 10. In response to not detecting the steering assembly 100 attached to the wheelchair 10, the motorized drive can be configured to operate in a first configuration. In response to detecting the steering assembly 100 attached to the wheelchair 10, the motorized drive can be configured to operate in a second configuration, different than the first configuration. The second configuration can include operating at a different speed (e.g. a faster speed, etc.). The motorized drive can also be configured to detect actuation of a manual brake and can include electronic braking to supplement the manual braking.

Figure 1:
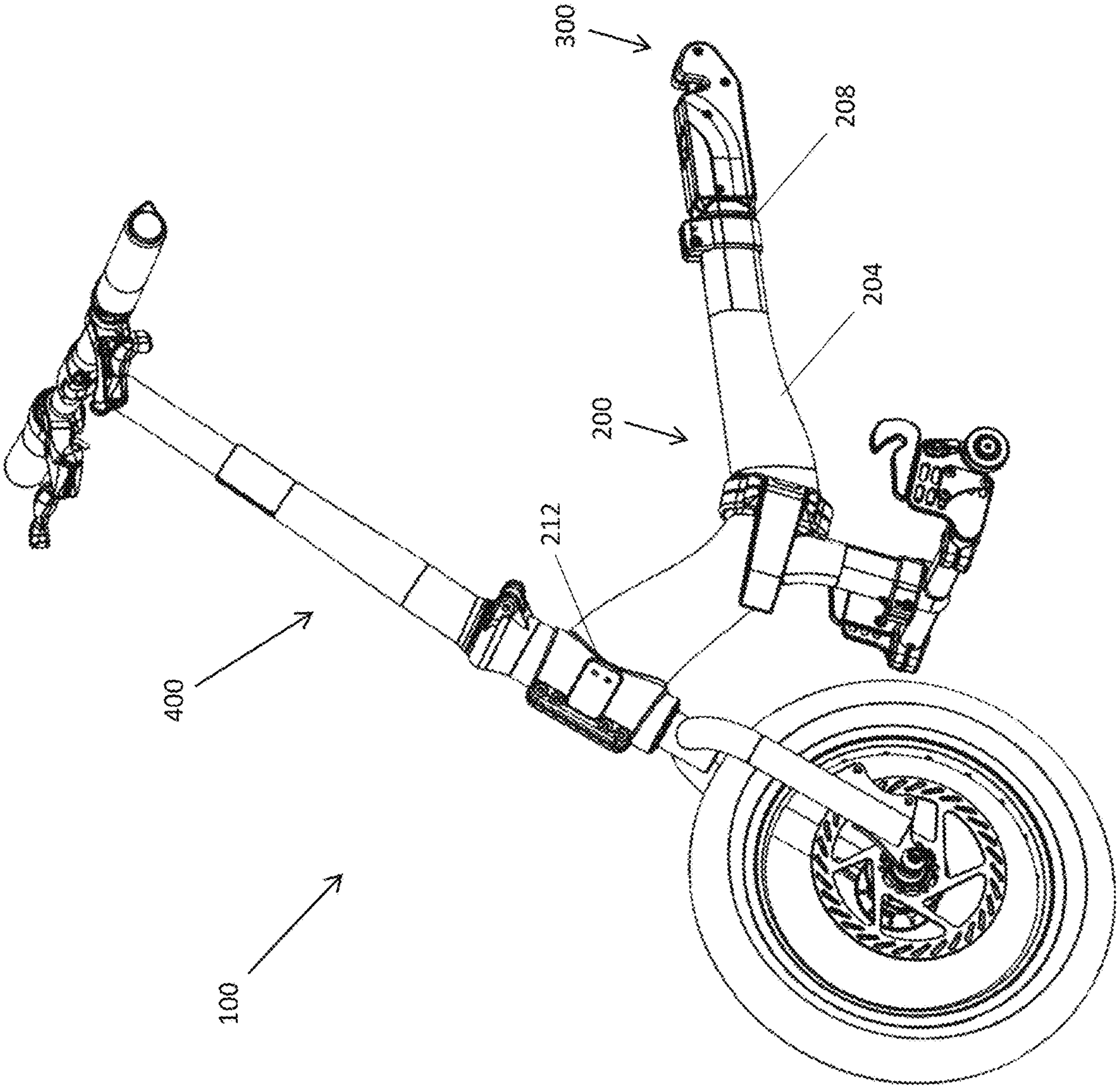
FIG. 1 is a perspective view of a steering assembly that is configured for selective attachment to a wheelchair.

With reference now to the figures, FIG. 1 illustrates an embodiment of a steering assembly 100. The steering assembly 100 (also referred to as a steering system 100 or a front add-on 100) includes a frame assembly 200, a mounting assembly 300, and a steering device 400. The frame assembly 200 includes an elongated frame member 204. The frame member 204 includes a first end 208 opposite a second end 212. The first end 208 is coupled to the mounting assembly 300. The second end is coupled to the steering device 400. The frame member 204 is substantially hollow from the first end 208 to the second end 212.

Figure 2:
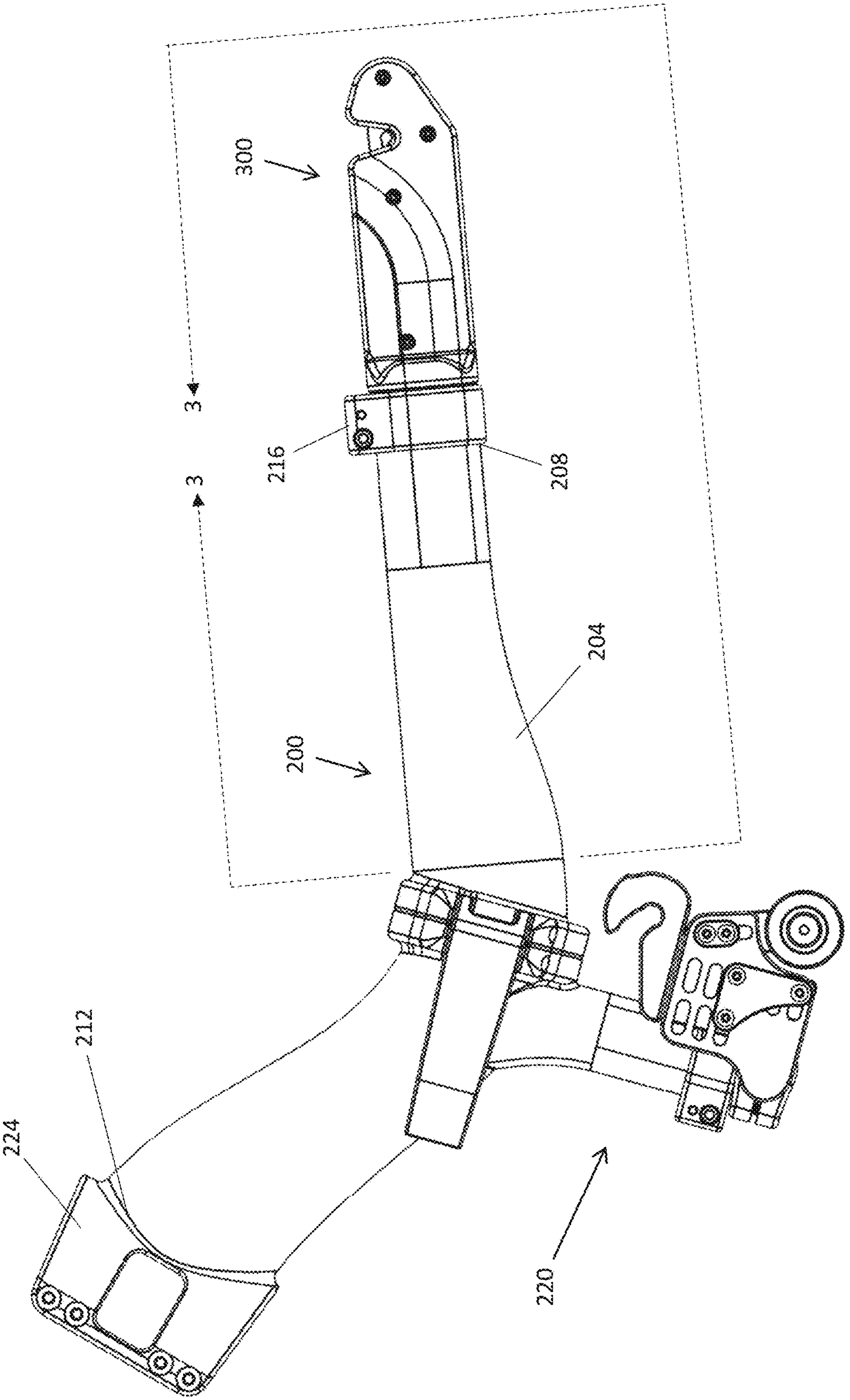
FIG. 2 is a side view of the steering assembly of FIG. 1, with the steering device removed.
Figure 3:
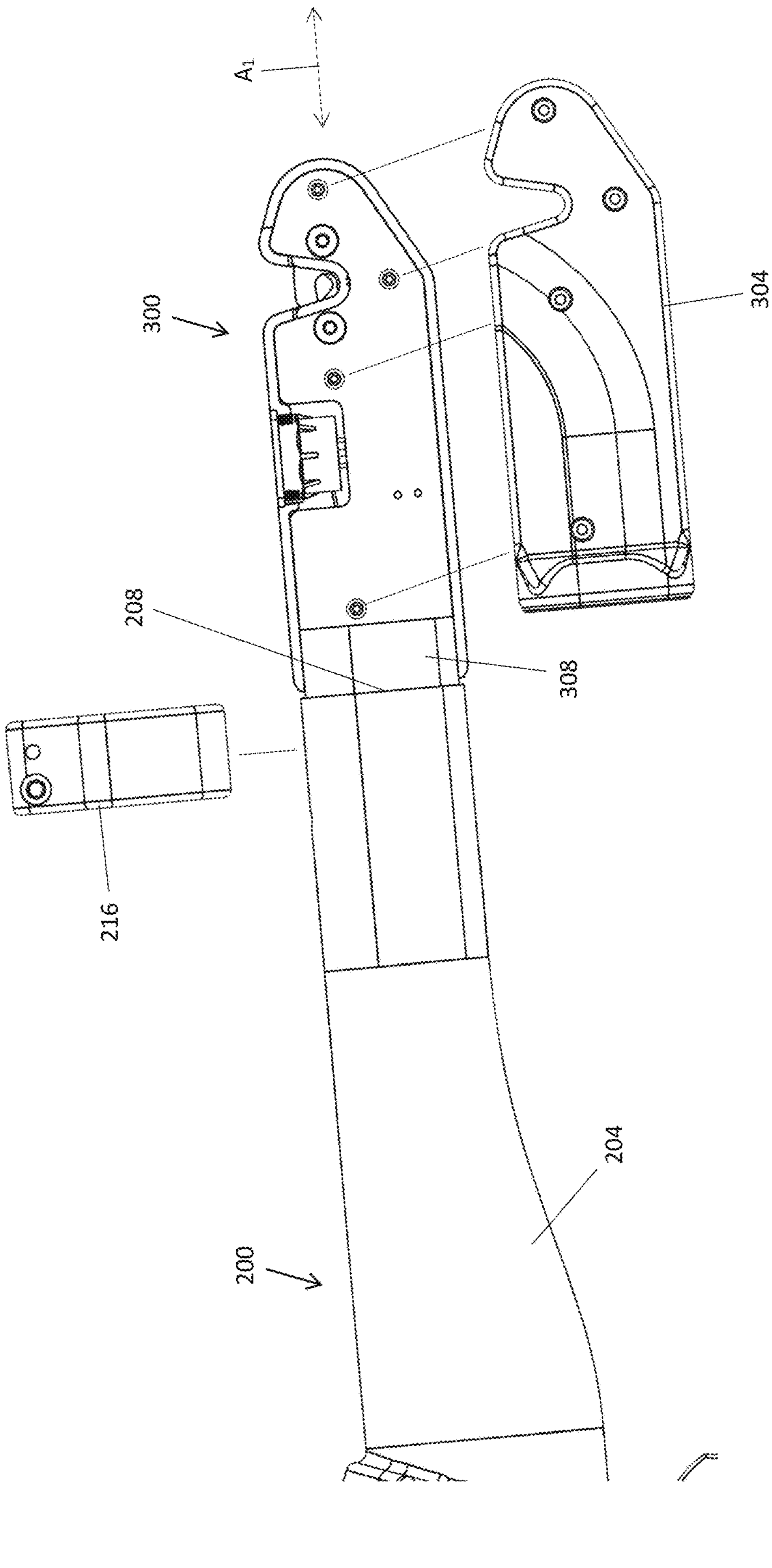
FIG. 3 is a partially exploded view of a portion of the steering assembly of FIG. 2, taken along line 3-3 of FIG. 2.

With reference to FIGS. 2-3, the mounting assembly 300 slidably engages the first end 208 of the frame member 204. A first removable locking member 216 (also referred to as a depth adjustment fastener 216), which is shown as a compression clamp 216, applies a compressive force on the frame member 204 to maintain the position of the mounting assembly 300 relative to the frame member 204. With specific reference to FIG. 3, which shows the first removable locking member 216 and a portion of an outer housing 304 of the mounting assembly 300 removed, the mounting assembly 300 includes a mounting member 308. The mounting member 308 is received by the first end 208 of the frame member 204. The mounting member 308 is configured to slide (or telescope) relative to the frame member 204 along a first axis $A_1$. The frame member 204 defines the first axis $A_1$. The mounting member 308 is configured to slide along the first axis $A_1$ to provide depth adjustment of the steering assembly 100 relative to the wheelchair 10. Once the mounting assembly 300 is slidably positioned (or repositioned) relative to the frame member 204 a desired distance along the first axis $A_1$, the first removable locking member 216 can engage the frame member 204. The first removable locking member 216 applies a compressive force on the frame member 204 and the mounting member 308, restricting sliding (or telescoping) movement between the members 204, 308. In other examples of embodiments, the mounting member 308 can be configured to receive a portion of the frame member 204, or the members 204, 308 can be coupled in any suitable manner to facilitate selective sliding or telescopic length adjustment along the first axis $A_1$. For example, the first removable locking member 216 that selectively connects (or selectively locks) members 204, 308 can be a button clip for selective engagement with a locking aperture, a telescoping lever clamp, a telescoping twist lock clamp, or any other device actuatable to lock the members to restrict length adjustment and unlock the members to allow length adjustment.

With reference back to FIG. 2, a lift assembly 220 is coupled to the frame member 204. The lift assembly 220 is also configured to selectively engage a portion of the wheelchair 10 (shown in FIG. 8). In addition, the lift assembly 220 provides the user adjustability in at least two directions to facilitate a customized user footrest on the steering assembly 100. A mounting assembly 224 is positioned at the second end 212 of the frame member 204. The mounting assembly 224 (also referred to as a compression arm 224 or a compression assembly 224) is coupled to the frame member 204 and configured to engage and retain the steering device 400. Thus, the steering device 400 is coupled to the second end 212 of the frame member 204. The steering device 400 can also be referred to as a steering member 400 or a steering column 400.

Figure 4:
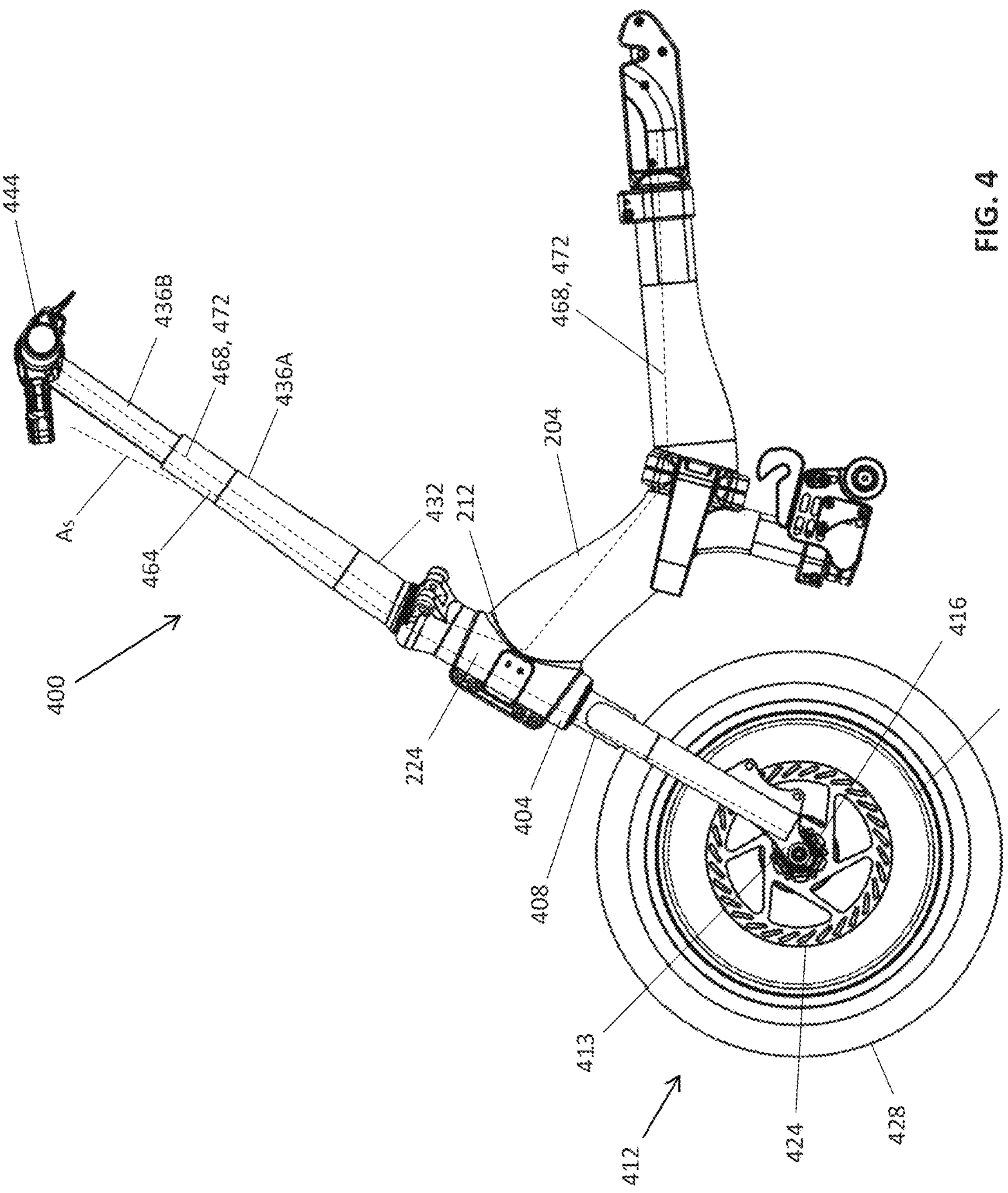
FIG. 4 is a side view of the steering assembly of FIG. 1.

With reference now to FIG. 4, the steering device 400 includes a head tube 404 (also referred to as a steering tube 404 or a tube member 404). The head tube 404 is received, and retained, by the mounting assembly 224. The head tube 404 is configured to be nonrotatable relative to the frame member 204. The head tube 404 receives a fork 408. The fork 408 (also referred to as a fork assembly 408) extends completely through the head tube 404 and is configured to rotate relative to the head tube 404. A front wheel assembly 412 is mounted to a first end 413 of the fork 408. The front wheel assembly 412 includes a wheel hub 416, a rim 420, a brake 424, and a tire 428. The wheel hub 416 (also referred to as a tire hub 416) is coupled to the fork 408. A rim 420 is coupled to the wheel hub 416, for example by a plurality of spokes (not shown). A brake 424 is coupled to the wheel hub 416. In the illustrated embodiment, the brake 424 is a disc brake that includes a caliper (not shown). In other embodiments, the brake 424 can be any suitable type of brake for selectively slowing rotation of the front wheel hub 416 (and associated wheel). The rim 420 carries a tire 428. The tire 428 includes an outer tread (not shown) and contains a tube (not shown) for inflation of the tire 428.

A stem 432 is coupled to the fork 408 at a second end opposite the first end 413 (or opposite the front wheel assembly 412). More specifically, the stem 432 is coupled to a steerer tube (not shown) of the fork 408. The steerer tube (also referred to as a steering shaft) is a portion of the fork 408 that extends through the head tube 404. The stem 432 is coupled to a handlebar 444 at an end opposite the connection to the fork 408. The stem 432 (also referred to as a steering stem 432 or a steering shaft 432) is defined by a plurality of tubular members 436. The plurality of tubular members 426 can include a first tubular member 436A and a second tubular member 436B. In other embodiments, the plurality of tubular members 436 can include three or more members 436. The plurality of tubular members 436 are substantially hollow members. In addition, the plurality of tubular members 436 are configured to telescope, or slide, relative to each other to facilitate height adjustment of the handlebar 444 relative to the head tube 404 (and in turn relative to the wheelchair 10). The height adjustment can be based on a user preference (e.g., user customization, user comfort, user fit, etc.). Each tubular member 436 has a cross sectional shape that facilitates sliding movement of the tubular members 436 relative to each other but restricts rotational movement of the tubular members 436 relative to each other. This allows for sliding adjustment between the members 436 (to adjust a height of the stem 432), while also allowing the members 436 to rotate together in response to rotational movement of the stem 432 by the user through rotation of the steering device 400 (i.e., in response to steering, etc.).

Figure 5:
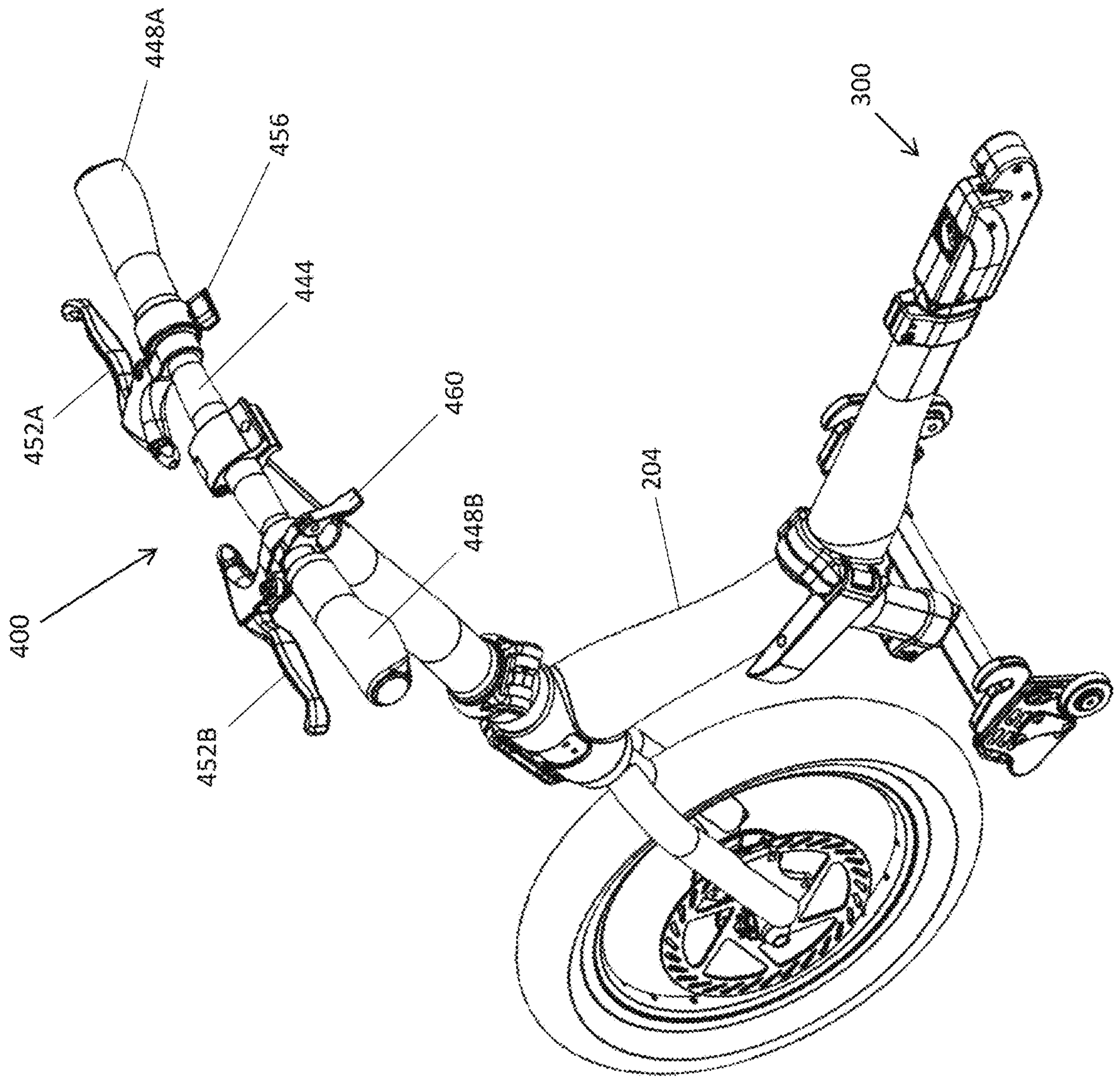
FIG. 5 is a perspective view of the steering assembly of FIG. 1, illustrating the handlebars of the steering device.

Referring now to FIG. 5, the handlebar 444 includes a plurality of handgrips 448A, B. The handgrips 448A, B provide a user a contact point to grasp and operate the handlebar 444. The handlebar 444 includes a plurality of brake actuators 452A, B (also referred to as brake levers 452A, B). Each brake actuator 452A, B is positioned relative to a respective handgrip 444A, B to allow the user to actuate one (or both) of the brake actuators 452A, B to initiate braking while continuing to engage the handgrips 448A, B. A throttle 456 is positioned relative to a first handgrip 448A, while a release actuator 460 (also called a release lever 460) is positioned relative to a second handgrip 448B. The throttle 456 can also be referred to as a first actuator 456, while the release actuator 460 can also be referred to as a second actuator 460.

With reference back to FIG. 4, the head tube 404 defines a steering axis $A_s$. The steering axis $A_s$ is the axis about which the steering components (e.g., the fork 408, the front wheel assembly 412, the stem 432, the handlebar 444, etc.) rotate. More specifically, the handlebar 444 is configured to be engaged by the user (through one or both handgrips 448A, B). As the user rotates the handlebar 444, the stem 432 responsively rotates, which in turn rotates the fork 408 and the front wheel assembly 412. The fork 408 rotates relative to the head tube 404, which remains stationary and coupled to the frame assembly 200 by the frame member 204. It should be appreciated that the stem 432 can be positioned at an angle to the steering axis $A_s$. The steering axis $A_s$ is defined by the head tube 404. The angle can be between approximately zero degrees (0°) and approximately twelve degrees (12°). Accordingly, the stem 432 can be positioned along the steering axis $A_s$, or can be angled from the steering axis $A_s$, for example up to approximately twelve degrees (12°).

One or both of the brake actuators 452A, B are in operable communication with the brake 424. For example, a brake cable 464 (shown in broken lines) can extend from the brake actuators 452A, B, through the hollow stem 432, to the brake 424. This allows actuation of the brake actuator(s) 452A, B to initiate operation of the brake 424 (e.g., engage the caliper with the disc, etc.). The throttle 456 and the release actuator 460 are each in operable communication with the mounting assembly 300. For example, a throttle cable 468 (or electrical cable 468) (shown in broken lines) can extend from the throttle 456, through the hollow stem 432, through the frame member 204 (e.g., from the second end 212 to the first end 208) to the mounting assembly 300. The throttle cable 468 can also be in communication with one or both brake actuators 452A, B to detect actuation of one (or both) of the brake actuators 452A, B. As another example, a release cable 472 (shown in broken lines) can extend from the release actuator 460, through the hollow stem 432, through the frame member 204 (e.g., from the second end 212 to the first end 208) to the mounting assembly 300. It should be appreciated that the throttle cable 468 and the release cable 472 are shown as a single broken line for purposes of clarity. The cables 468, 472 can be separate, individual cables positioned adjacent each other (or connected to each other). In addition, in other embodiments an additional cable (not shown) can be in communication with one or both of the brake actuators 452A, B and the mounting assembly 300 to detect actuation of one (or both) of the brake actuators 452A, B. In other embodiments, the throttle 456 and/or the release actuator 460 can be in communication with the mounting assembly 300 wirelessly (e.g., Bluetooth, etc.) or through any suitable communication system to respectively provide throttle adjustment or release of the mounting assembly 300 in response to actuation of the respective throttle 456, release actuator 460, and/or brake actuators 452A, B. In other examples of embodiments, the throttle 456 can be in wireless communication with the motorized drive assembly 30 (e.g., Bluetooth, etc.) or through any suitable communication system to respectively provide throttle adjustment in response to actuation of the throttle 456. In addition, the brake actuators 452A, B can be in wireless communication with the brake 424 and/or the motorized drive assembly 30. The wireless communication can be through any suitable communication system (e.g., Bluetooth, etc.) to respectively provide braking in response to actuation of at least one brake actuator 452A, B.

Figure 6:
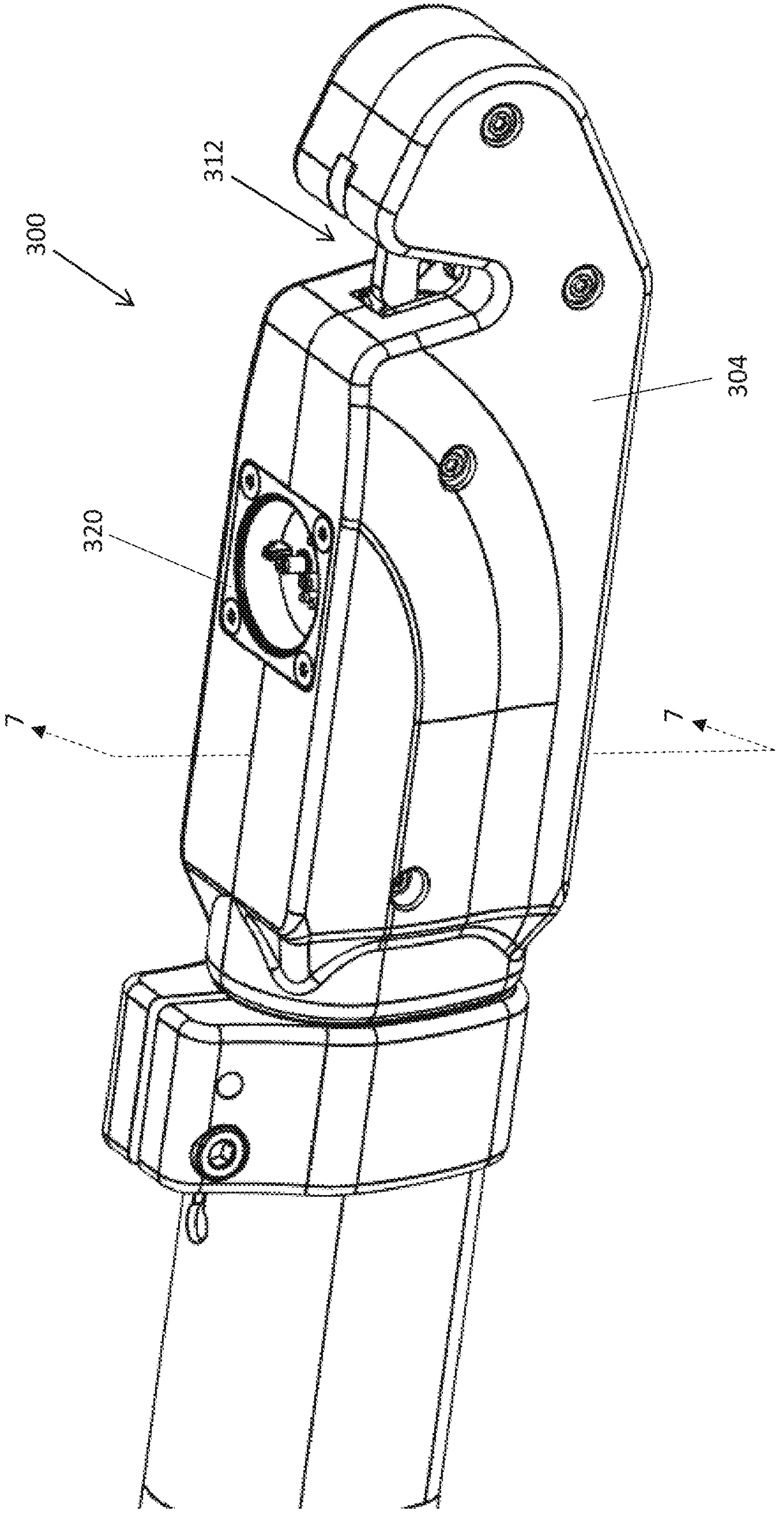
FIG. 6 is a perspective view of the mounting assembly of the steering assembly of FIG. 1.

With reference now to FIG. 6, the mounting assembly 300 includes the outer housing 304, which is formed of two mating halves that couple to form the housing 304 (or cover 304). A plurality of fasteners (e.g., bolts, screws, etc.) couple the halves of the outer housing 304, while also fastening the outer housing 304 to the mounting member 308. The outer housing 304 defines a channel 312 (also referred to as a recess 312). The channel 312 provides access to a portion of a latch assembly 316 (shown in FIG. 7). The outer housing 304 also defines a recess that receives an electrical connector 320. The latch assembly 316 provides a mechanical connection between the steering assembly 100 and the wheelchair 10, while the first electrical connector 320 provides an electrical connection between the steering assembly 100 and the wheelchair 10.

Figure 7:
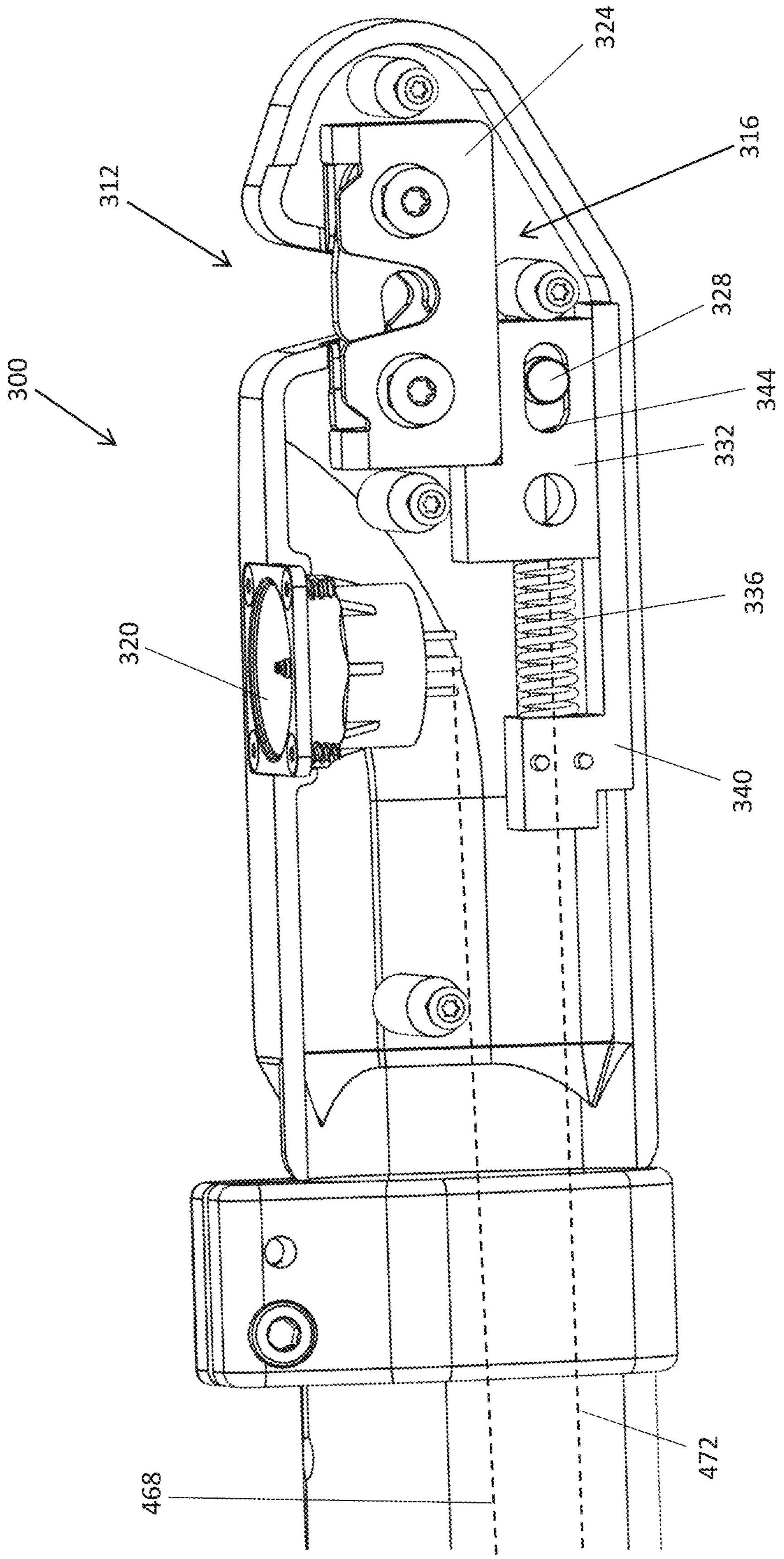
FIG. 7 is a cross-sectional view of the mounting assembly of FIG. 8, taken along lines 7-7 of FIG. 6, and with a throttle cable and a release cable removed for clarity.

With reference now to FIG. 7, the latch assembly 316 includes a latch portion 324, a latch release pin 328, a latch cable bracket 332, a biasing member 336, and a holder 340. The latch portion 324 is a latch that is configured to be actuated between a locked position (illustrated in FIG. 7), and an unlocked position. In the illustrated embodiment the latch portion 324 is a rotary latch. However, in other embodiments, the latch portion 324 can be any suitable latch or locking assembly that can be actuated between a locked portion and an unlocked position. The latch release pin 328 engages a portion of the latch portion 324, specifically an arm (not shown) that actuates the latch between the locked and unlocked position. The latch release pin 328 is received by the latch cable bracket 332, and specifically an elongated aperture 344 defined by the latch cable bracket 332. The latch cable bracket 332 is biased by a biasing member 336 (or spring 336). The biasing member 336 contacts the latch cable bracket 332 on one end, and the holder 340 at the opposite end. The latch cable bracket 332 is configured to slide along a portion of the holder 340. The release cable 472 (shown in broken lines), which extends from the release actuator 460, engages the latch cable bracket 332.

The electrical connector 320 is a first electrical connector 320, shown as a female electrical connector 320. The first electrical connector 320 is electrically connected to the throttle 456 by the throttle cable 468 (or electrical cable 468) (shown in FIG. 4). The first electrical connector 320 can also be electrically connected to one or both brake actuators 452A, B to detect actuation of one (or both) of the brake actuators 452A, B. The electrical connection can be by the throttle cable 468 (or a portion thereof), or a separate cable. The first electrical connector 320 can include one or more magnets to facilitate a magnetic connection with a corresponding second electrical connector 528, discussed in addition detail below. It should be appreciated that the latch assembly 316 can also be referred to as a first connection assembly 316, and the first electrical connector 320 can also be referred to as a second connection assembly 320.

Figure 8:
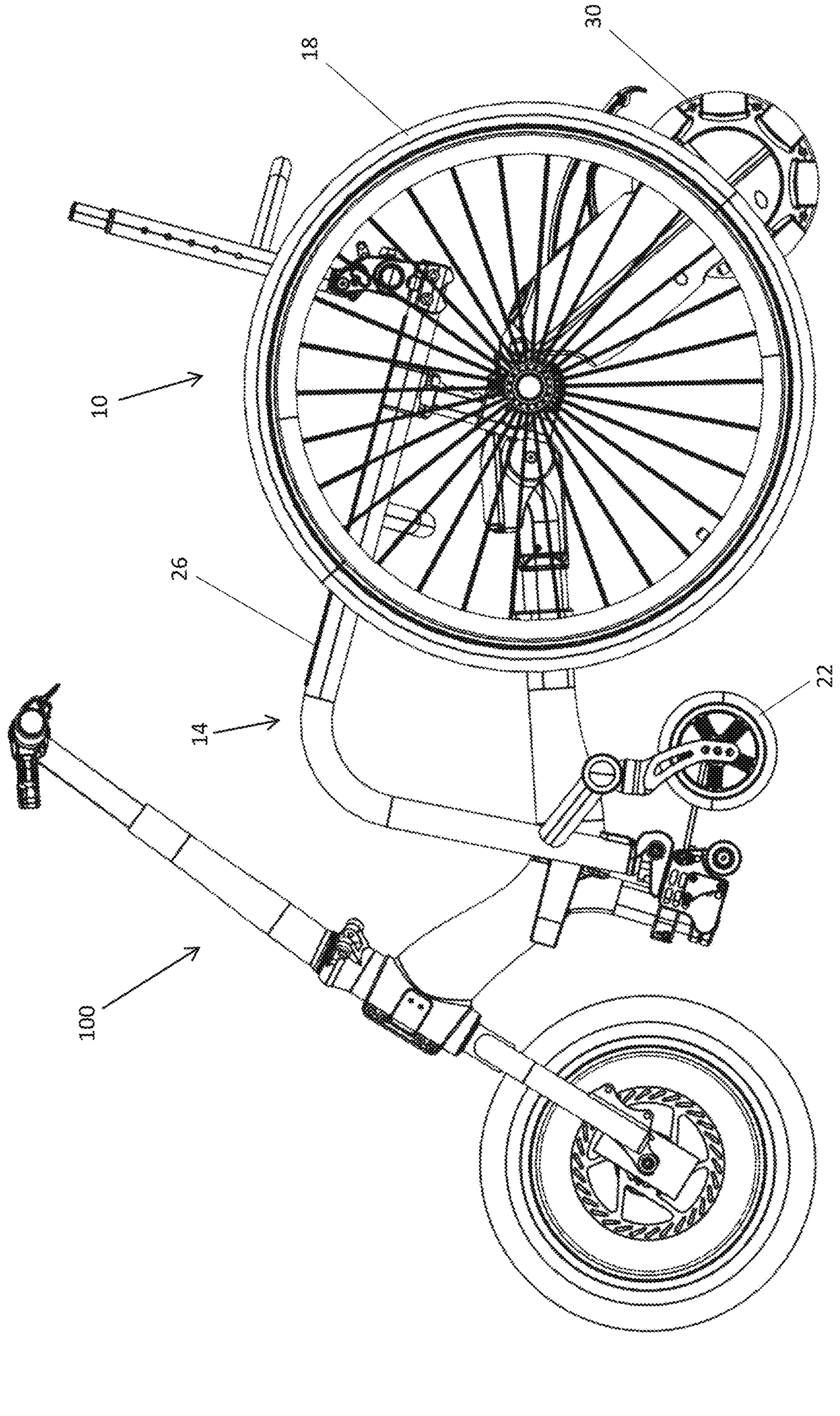
FIG. 8 is a side view of the steering assembly of FIG. 1 attached to a wheelchair.
Figure 9:
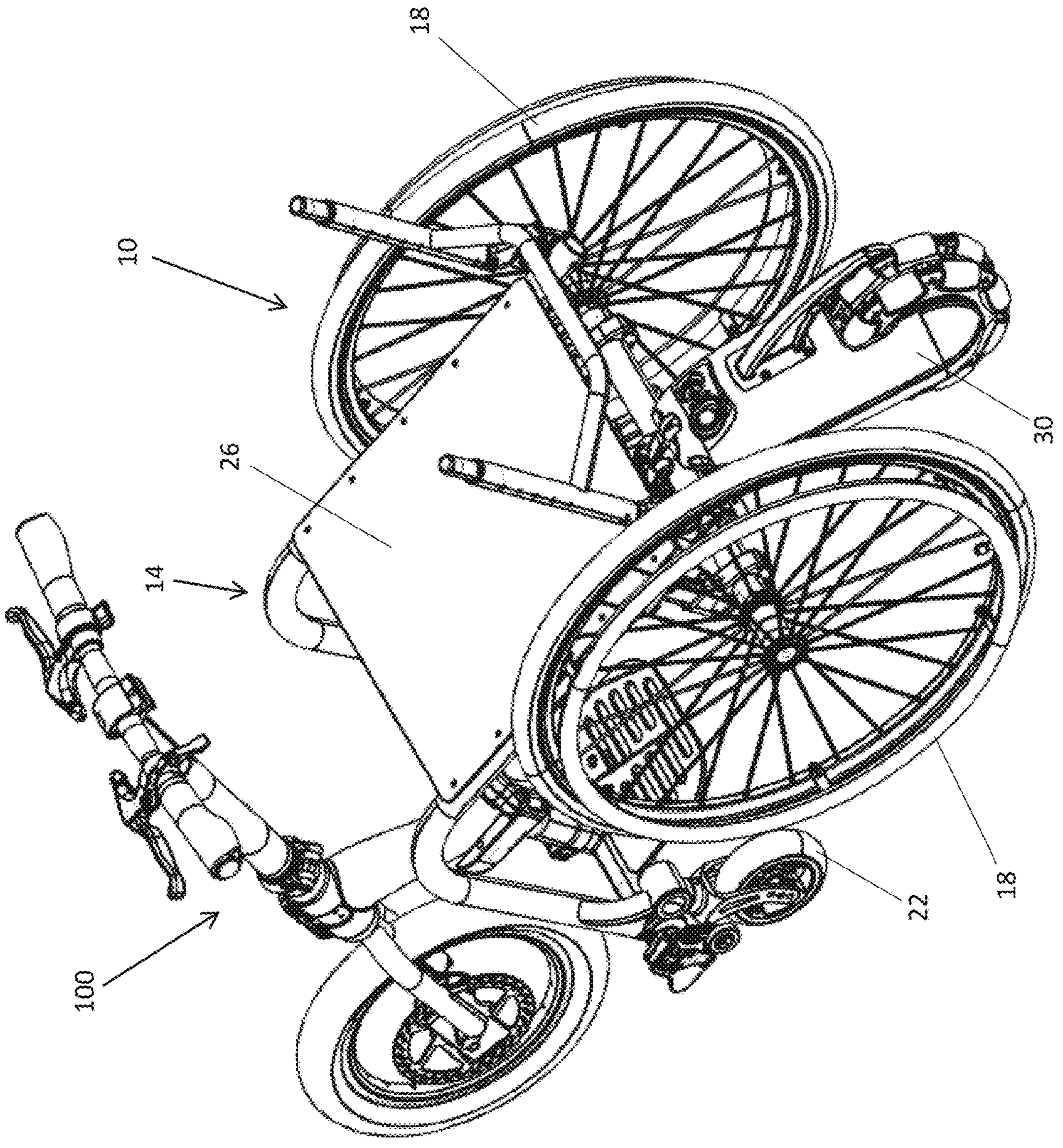
FIG. 9 is a perspective view of the steering assembly attached to the wheelchair of FIG. 8.
Figure 10:
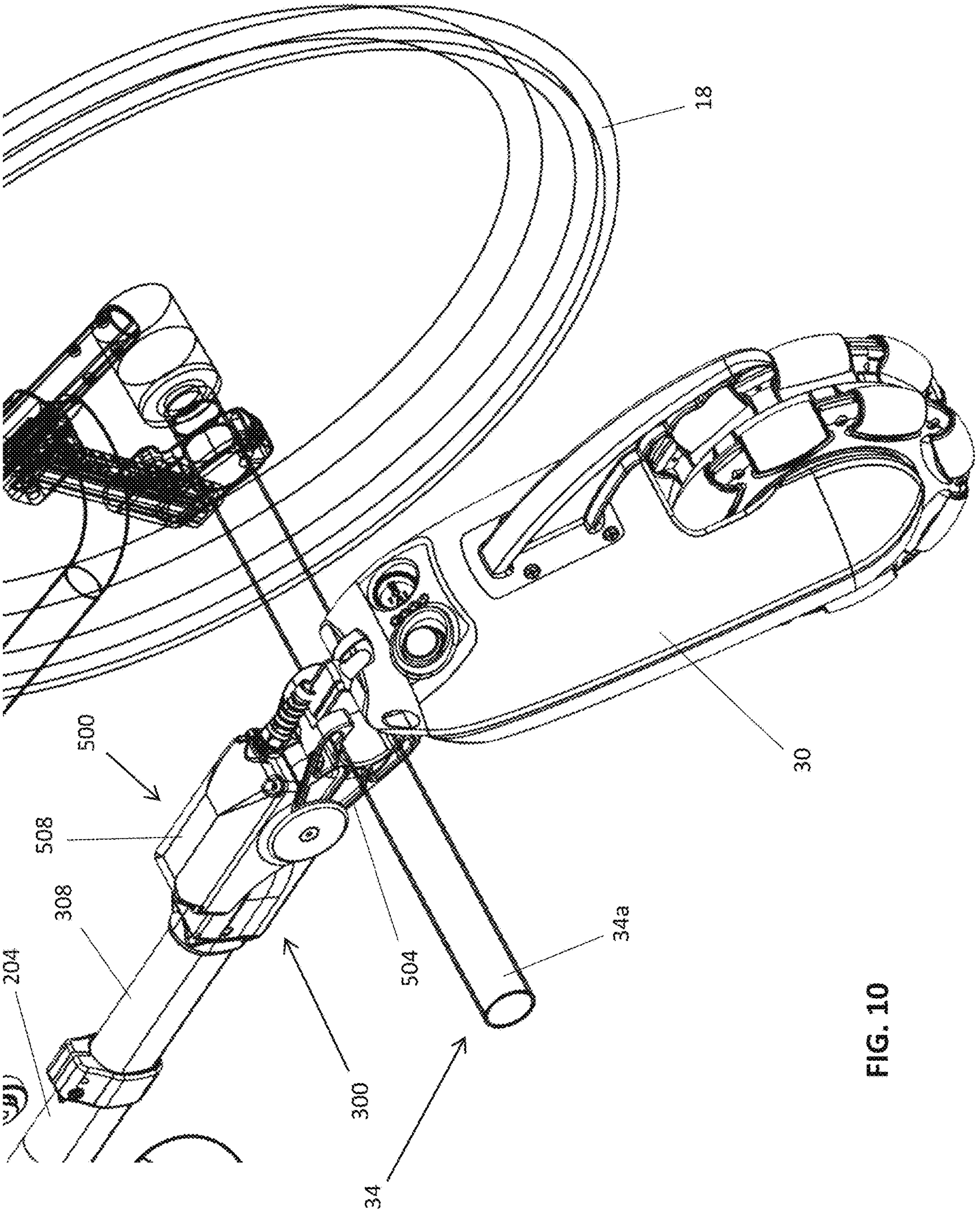
FIG. 10 is a perspective view of the steering assembly attached to a mounting member of the wheelchair of FIG. 8, illustrating one of the rear wheels and an electrical cable connecting the drive assist to the connection assembly being removed for clarity.

With reference now to FIG. 8-10, the steering assembly 100 is shown selectively attached to the wheelchair 10. The wheelchair 10 is illustrated as a manual wheelchair 10. With specific reference to FIGS. 8-9, the wheelchair 10 includes a frame assembly 14. The frame assembly 14 carries a pair of rear wheels 18 and a pair of caster wheels 22. The frame assembly 14 also carries a seat 26. It should be appreciated that FIG. 10 depicts a first side of the wheelchair 10. A second, opposite side (not shown) is a mirror image to the illustrated first side, with the second side having the same components shown on the first side (e.g., a rear wheel 18, a caster wheel 22, etc.). A motorized drive assembly 30 is coupled to the wheelchair 10. More specifically, the motorized drive assembly 30 is coupled to a mounting assembly 34 fastened to the wheelchair 10. The motorized drive assembly 30 is a motorized drive system that provides motorized drive assistance to propel the wheelchair 10. In the illustrated embodiment, the motorized drive assembly 30 is a drive assist 30 that provides motorized propulsion to the wheelchair 10. The drive assist 30 is positioned rearward of the rear wheels 18, and more specifically rearward of an axis of rotation of the rear wheels 18. The axis of rotation of the rear wheels 18 can be defined by a rear axle of the wheelchair 10. In at least one example of an embodiment, a portion of the drive assist 30 is positioned rearward of the rear axle of the wheelchair 10. In other examples of embodiments, a majority of the drive assist 30 is positioned rearward of the rear axle of the wheelchair 10. Stated another way, the drive assist 30 can be configured to contact the surface upon which the wheelchair 10 is positioned (e.g., ground, flooring, etc.) rearward of the axis of rotation of the rear wheels 18. In addition, the drive assist 30 can be coupled to the wheelchair 10 at a position between the rear wheels 18. For example, the drive assist 30 can be coupled (or mounted or fastened) to a portion of the frame assembly 14 of the wheelchair 10 located between the rear wheels 18. Stated another way, the rear wheels 18 can define an outer boundary, the outer boundary being perpendicular to the rear axle (and perpendicular to the axis of rotation of the rear wheels 18). The drive assist 30 can be coupled (or mounted or fastened) to a portion of the frame assembly 14 of the wheelchair 10 located between (or defined by) the outer boundary. The drive assist 30 is configured to apply a driving force to the wheelchair 10 to drivingly assist with rotation of the rear wheels 18. The illustrated drive assist 30 is a SMARTDRIVE drive assist sold by Max Mobility LLC a division of Permobil AB, which has a corporate headquarters in Timra, Sweden. It should be appreciated that in other embodiments, the motorized drive assembly 30 can be any suitable drive system that facilitates propulsion of the wheelchair 10. The mounting assembly 34 can include at least one mounting member 34*a* configured to facilitate a connection of the motorized drive assembly 30 to the wheelchair 10. In addition, the mounting member 34*a* can be any suitable member configured to facilitate a connection of the steering assembly 100 to the wheelchair 10. The mounting member 34*a* can be fastened (or coupled) to the wheelchair 10, and more specifically fastened (or coupled) to the frame assembly 14. In the example of embodiment shown in FIGS. 8-10, the mounting member 34*a* is the rear axle of the wheelchair 10. The rear axle 34*a* connects the rear wheels 18 to the frame assembly 14. In other examples of embodiments of the wheelchair 10, the mounting member 34*a* can be a member separate from the rear axle. For example, the mounting member 34*a* can be coupled to the frame assembly 14. The mounting member 34*a* can be positioned on the frame assembly 14 on a side of the seat 26 opposite a side engaged by the user. The mounting member 34*a* can be positioned between the casters 22 and the rear axle or can be positioned on a side of the rear axle opposite the side closest to the casters 22. It should be appreciated that the mounting member 34*a* can be movable relative to the frame assembly 14. For example, in embodiments where the wheelchair 10 is a folding wheelchair, the mounting member 34*a* can be configured to move, pivot, or collapse relative to the frame assembly to facilitate folding (or collapsibility) of the frame assembly 14. It should also be appreciated that the mounting assembly 34 can include at least one member 34*a* or a plurality of members 34*a*. For example, the mounting assembly 34 can include a first mounting member and a second mounting member. In some embodiments, both the first and second mounting members can be fastened (or coupled) to the frame assembly 14. In some embodiments, the first mounting member can be fastened (or coupled) to the frame assembly 14 on a caster 22 side of the rear axle, while the second mounting member can be fastened (or coupled) to the frame assembly 14 on an opposite side of the rear axle. In another example of an embodiment, one of the first or second mounting member can be the rear axle. To this end, the term mounting assembly 34 can include at least one member, and further can include a plurality of members.

With reference now to FIG. 10, a connection assembly 500 is coupled to the mounting member 34*a* of the wheelchair 10. In the illustrated embodiment, the mounting member 34*a* is depicted as the rear axle 34*a* of the wheelchair 10. The connection assembly 500 facilitates the mechanical and electrical connection between the steering assembly 100 and the wheelchair 10. More specifically, the connection assembly 500 facilitates the mechanical connection between the mounting assembly 300 and the rear axle 34*a* of the wheelchair 10. Further, the connection assembly 500 facilitates the electrical connection between the steering assembly 100 and the motorized drive assembly 30 mounted to the wheelchair 10. The connection assembly 500 includes a first connection portion 504 and a second connection portion 508. The first and second connection portions 504, 508 are coupled together by at least one fastener (e.g., a bolt, a screw, etc.).

Figure 11:
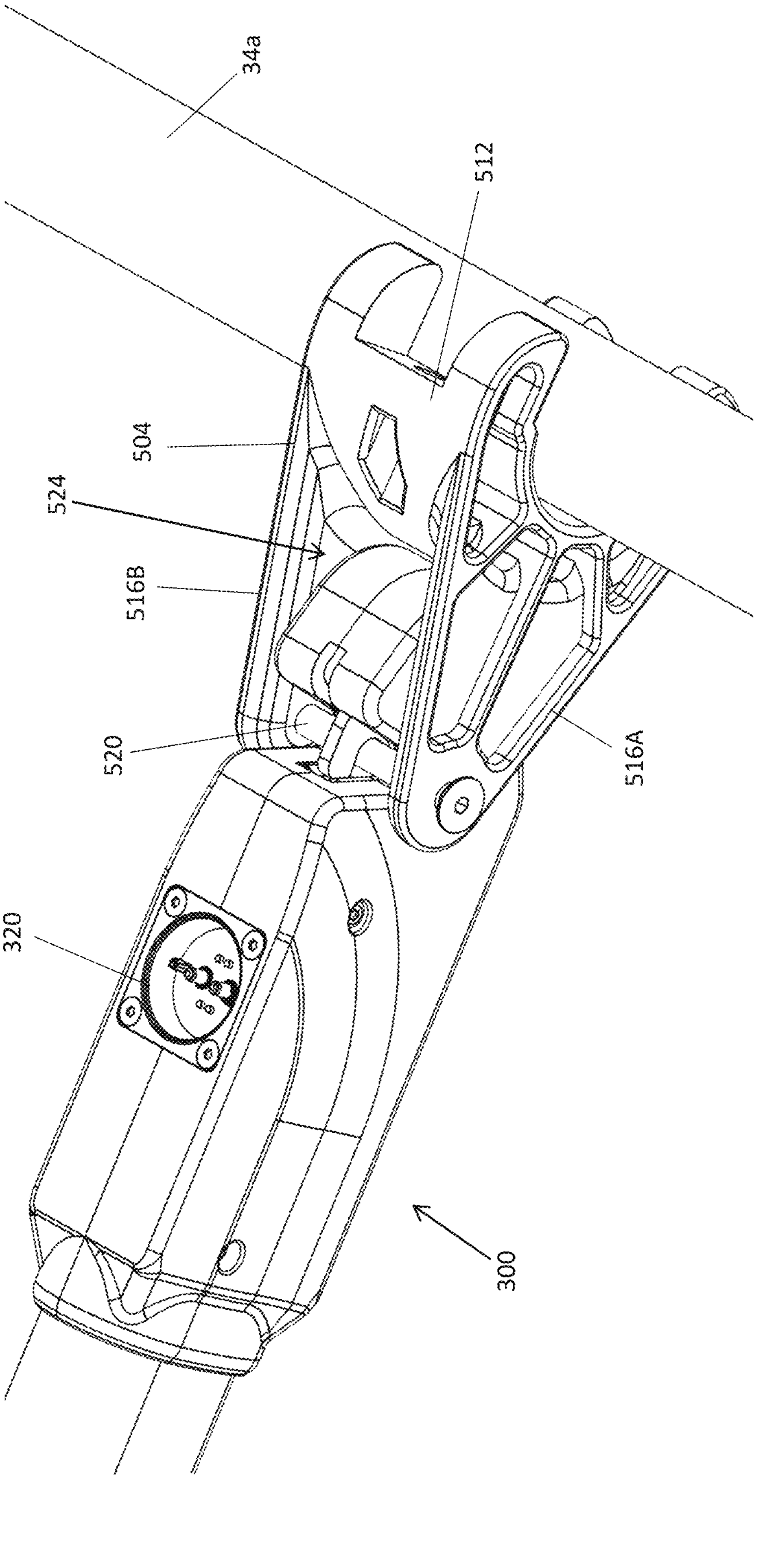
FIG. 11 is perspective view of the mounting assembly coupled to a first connection portion of the connection assembly, a second connection portion removed for clarity.

With reference to FIG. 11, the first connection portion 504 facilitates the selective mechanical connection between the mounting assembly 300 of the steering assembly 100 and the rear axle 34*a* of the wheelchair 10. The first connection portion 504 includes a mounting member attachment portion 512 (also referred to as an axle attachment portion 512) that is configured to couple the connection assembly 500 to wheelchair 10, and more specifically to the rear axle 34*a* of the wheelchair 10. The first connection portion 504 also includes opposing side members 516A, B. A latch pin 520 extends between the side members 516A, B. The side members 516A, B also define an aperture 524 that is configured to receive a portion of the mounting assembly 300 upon engagement.

Figure 12:
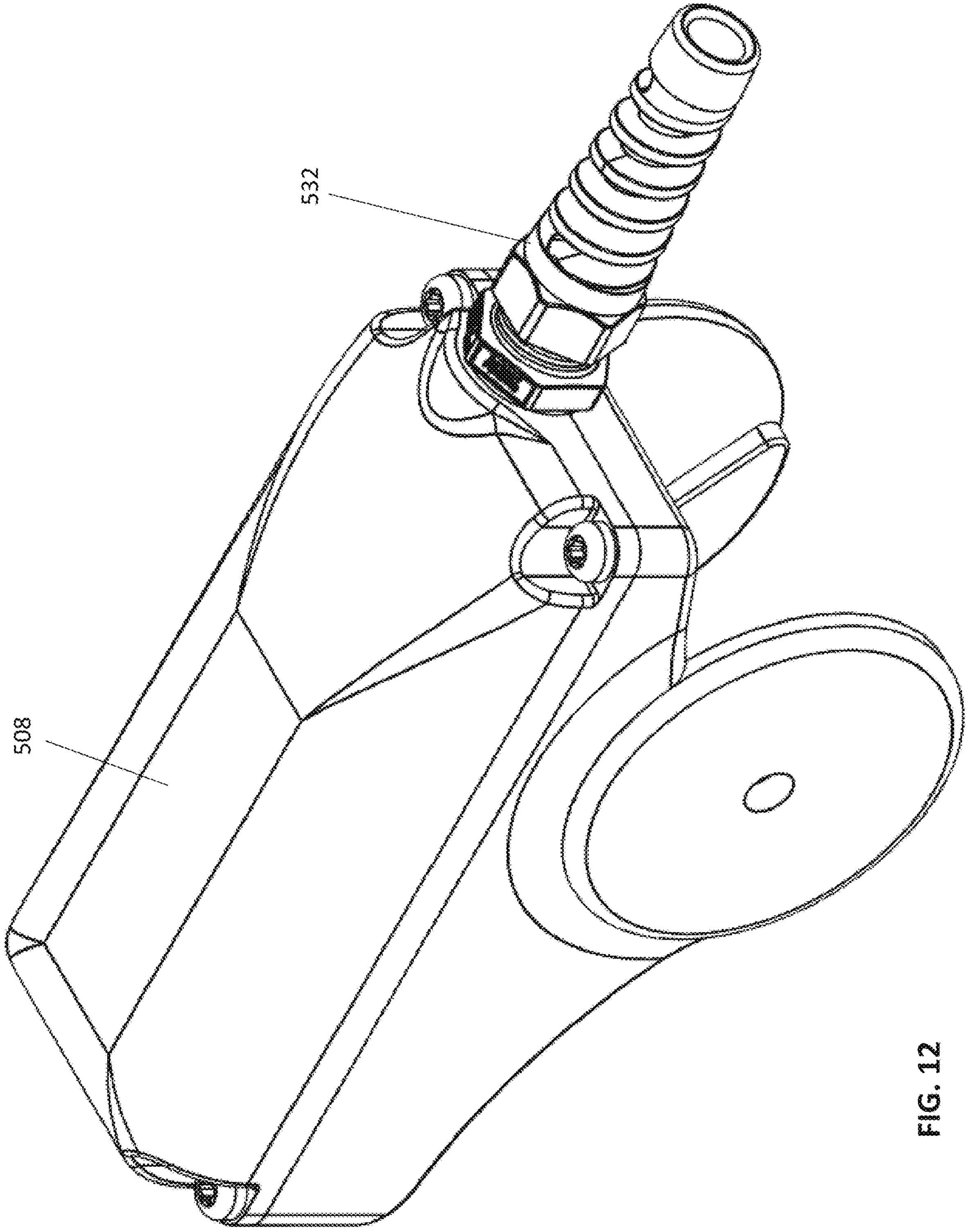
FIG. 12 is a perspective view of the second connection portion detached from the first connection portion of the connection assembly.
Figure 13:
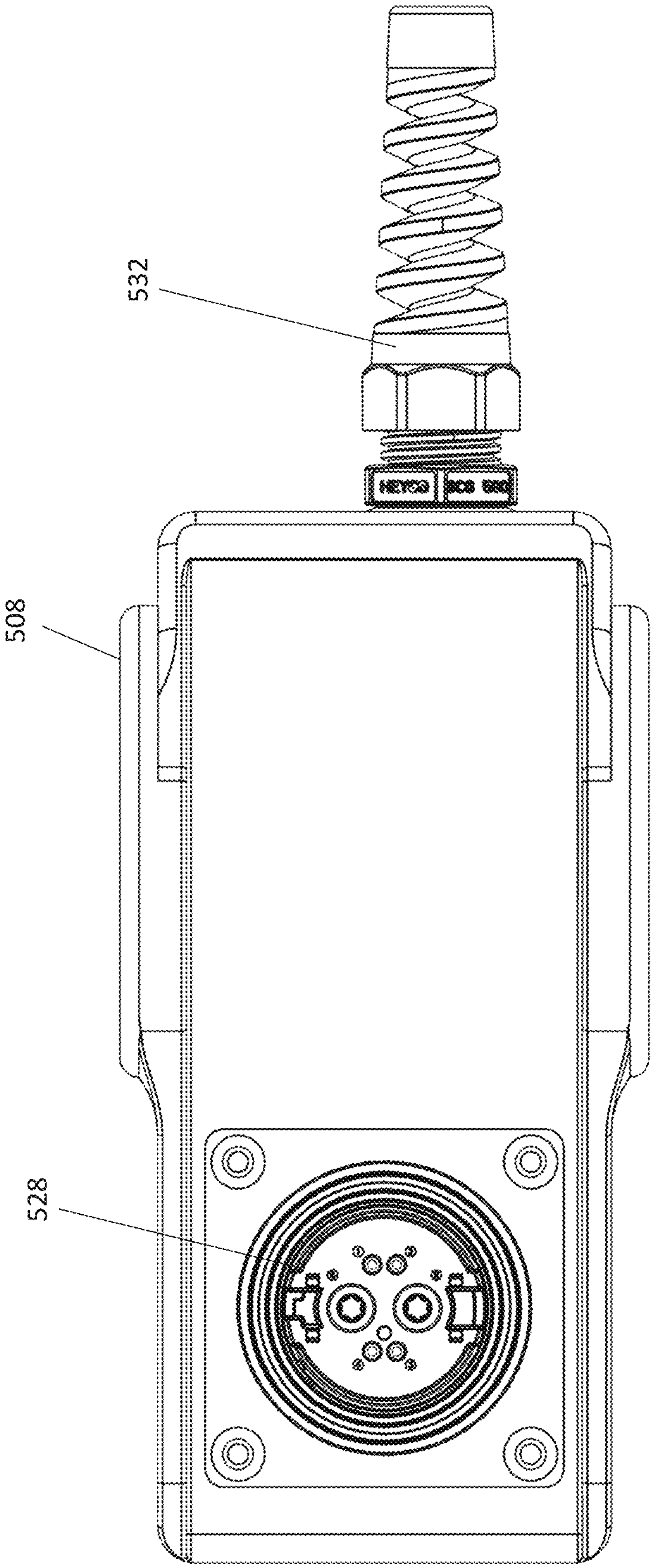
FIG. 13 is a perspective view of a bottom of the second connection portion of FIG. 11.

Referring now to FIGS. 12-13, the second connection portion 508 includes a second electrical connector 528 (shown in FIG. 13) and an electrical cable 532 that is configured to engage the motorized drive assembly 30 (see FIG. 10). The second electrical connector 528 and the electrical cable 532 are operably connected within the second connection portion 508 to direct the necessary communication from the connection assembly 500 to the motorized drive assembly 30. The second electrical connector 528 is illustrated as a male electrical connector that is configured to engage the female electrical connector of the first electrical connector 320. The second electrical connector 528 can include one or more magnets to facilitate the magnetic connection with the corresponding first electrical connector 320. In other embodiments, one of the first or second electrical connectors 320, 528 can be a male electrical connector, while the other 528, 320 can be a complimentary female electrical connector. In other embodiments, the first and second electrical connectors 320, 528 can be any combination of selectively removable connectors suitable to electrically connect the steering assembly 100 to the motorized drive assembly 30 of the wheelchair 10. It should be appreciated that the magnets associated with the connectors 320, 528 can be optional. In other examples of embodiments, the connectors 320,528 can be connected without a magnetic connection. In these embodiments, the connectors 320, 528 can engage (or otherwise connect) through a mechanical connection, or any other suitable connection of the connectors 320, 528 to facilitate the associated electrical connection.

Figure 14:
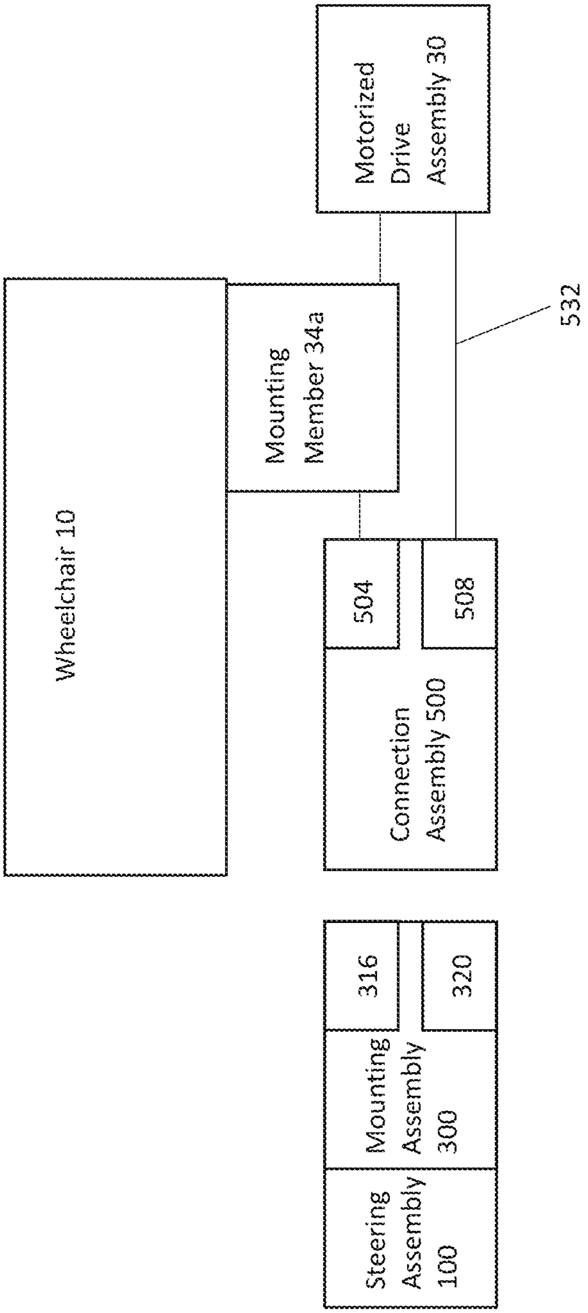
FIG. 14 is a schematic diagram of the steering assembly of FIG. 1 being detached from the wheelchair.

FIG. 14 is a schematic diagram of the wheelchair 10 with the connection assembly 500 and the motorized drive assembly 30 attached to the rear axle 34*a*. The connection assembly 500 is coupled to the rear axle 34*a* by the first connection portion 504. The connection assembly 500 is electrically connected to (or in electrical communication with) the motorized drive assembly 30 by the second connection portion 508 through the electrical cable 532. The steering assembly 100 is illustrated as detached (or disconnected) from the wheelchair 10.

Figure 15:
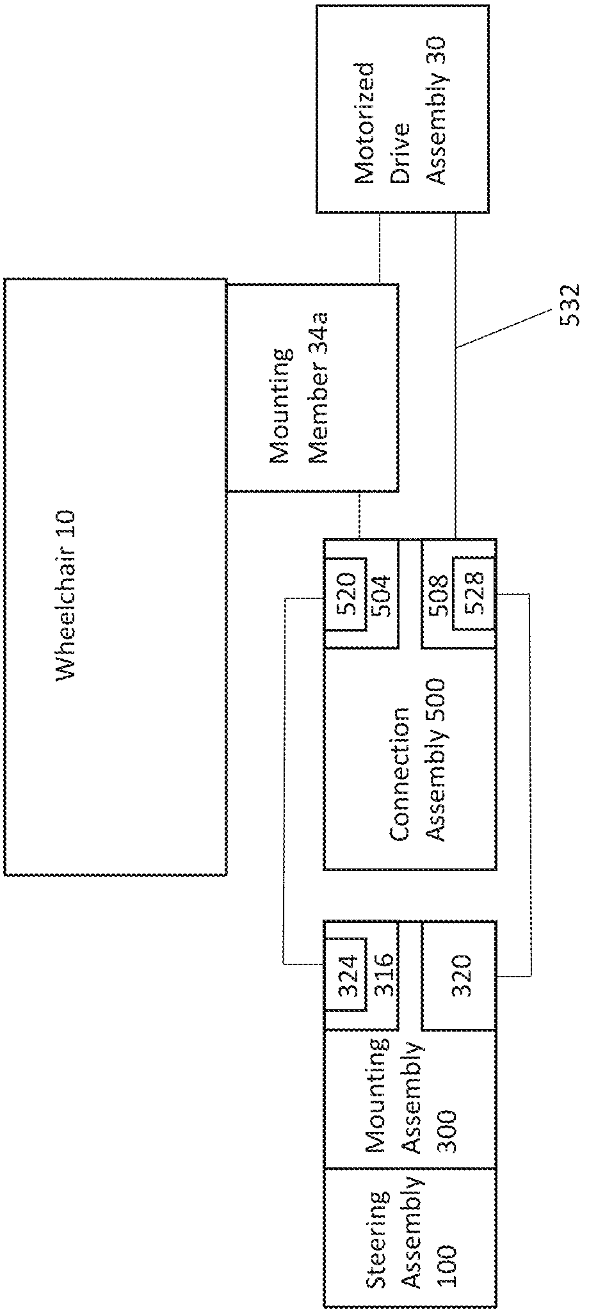
FIG. 15 is a schematic diagram of the steering assembly of FIG. 1 being attached from the wheelchair.

FIG. 15 is a schematic diagram of the wheelchair 10 with the connection assembly 500 and the motorized drive assembly 30 attached to the rear axle 34*a*, and the steering assembly 100 is selectively engaged (or attached or connected) to the wheelchair 10. Once attached, the mounting assembly 300 selectively couples to the rear axle 34*a* of the wheelchair 10, while also selectively electrically connects the steering assembly 100 to the motorized drive assembly 30. More specifically, the user lifts the mounting assembly 300 towards the connection assembly 500, which is coupled to the rear axle 34*a*. The channel 312 receives the latch pin 520, which directs the latch pin 520 to engage the latch assembly 316, and more specifically the latch portion 324. Once the latch portion 324 receives and engages the latch pin 520, the latch assembly 316 is engaged with the first connection portion 504 of the connection assembly 500, mechanically connecting the steering assembly 100 to the wheelchair 10 (and specifically the rear axle 34*a* of the wheelchair 10).

As the mechanical connection between the mounting assembly 300 and the rear axle 34*a* occurs, the electrical connection also occurs. The first electrical connector 320 of the mounting assembly 300 is lifted towards the second electrical connector 528 of the second connection portion 508 of the connection assembly 500. The magnets of the connectors 320, 528 interact to draw the connectors 320, 528 together. Accordingly, the first electrical connector 320 engages with the second electrical connector 528 to form the selective electrical connection between the steering assembly 100 and the motorized drive assembly 30 (through the electrical cable 532).

Figure 16:
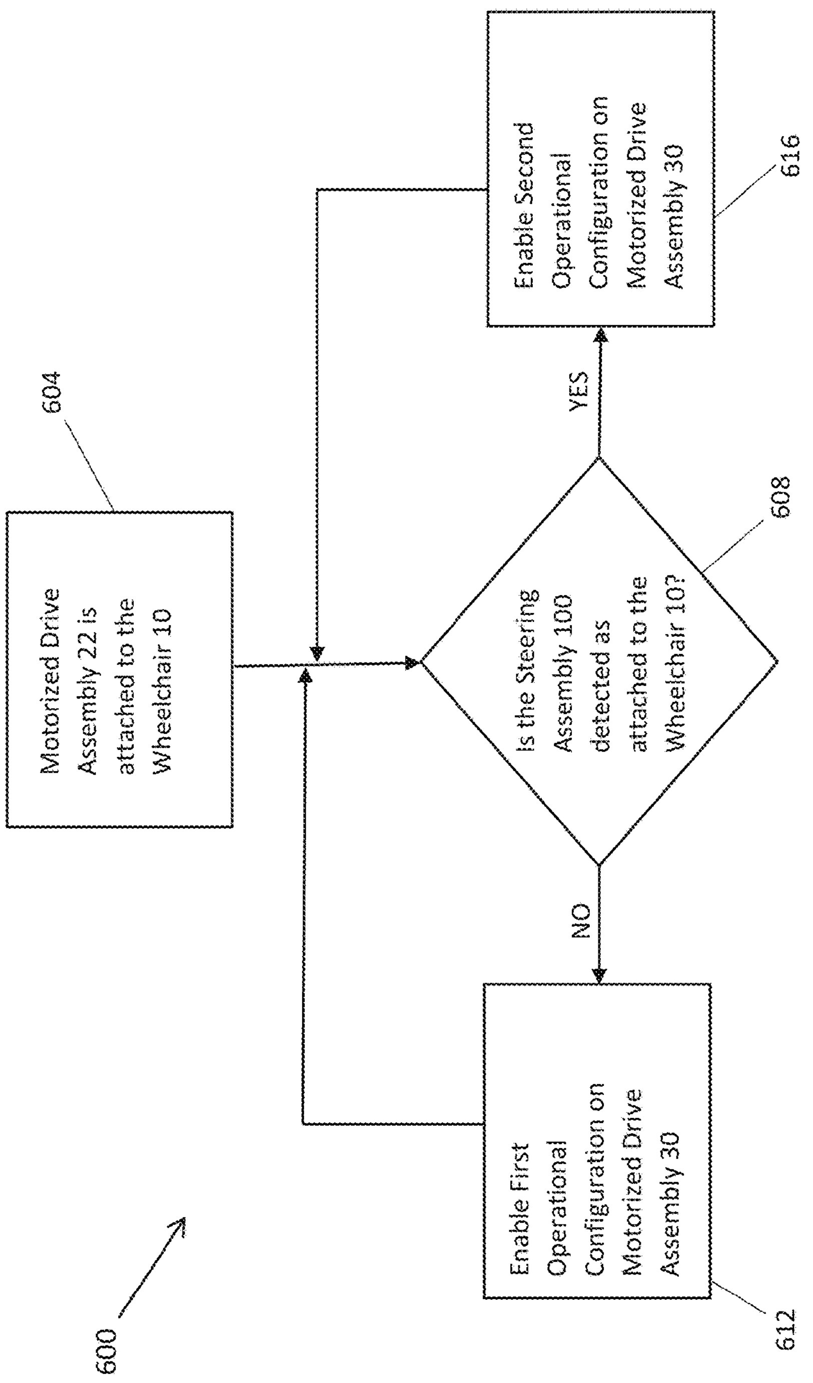
FIG. 16 is a flowchart of a control system for use with the motorized drive assembly and steering assembly of FIG. 8.

FIG. 16 illustrates an example of a control system or application 600 that detects attachment of the steering assembly 100 to the wheelchair 10 and based on that detection implements an operational parameter for the motorized drive assembly 30. More specifically, in response to not detecting the steering assembly 100 attached to the wheelchair 10, the control system 600 can implement a first configuration (or a first operational parameter) to operate the motorized drive assembly 30. In response to detecting the steering assembly 100 attached to the wheelchair 10, the control system 600 can implement a second configuration (or a second operational parameter) to operate the motorized drive assembly 30.

The control system 600 can be a module that operates on the motorized drive assembly 30. In other embodiments, the control system 600 can be distributed (i.e. operates on a remote server or from a remote location) and is in communication with the motorized drive assembly 30. For example, the control system 600 can operate on a remote computing device (e.g., a mobile phone, tablet computer, etc.) that is in communication with the motorized drive assembly 30. The communication can be through any suitable wireless connection, Bluetooth, a local area network, generally over the Internet, etc. The control system 600 includes a series of processing instructions or steps that are depicted in flow diagram form.

Referring to FIG. 16, the control system 600 begins at step 604, where the motorized drive assembly 30 is mounted to the wheelchair 10. In the illustrated embodiments, the motorized drive assembly 30 is attached to the rear axle 34*a* of the wheelchair 10. In addition to the physical (or mechanical) attachment of the wheelchair, the motorized drive assembly 30 is electrically connected to the connection assembly 500, for example by electrical cable 532.

Next, at step 608, the control system 600 detects whether the steering assembly 100 is attached to the wheelchair 10. For example, the motorized drive assembly 30 is configured to receive communications from the steering assembly 100. The motorized drive assembly 30 is configured to receive at least one analog signal. In other embodiments, the motorized drive assembly 30 can be configured to receive at least one digital signal and/or at least one analog signal. The signal can be communicated through at least one port (or an expansion port), such as the port used to electrically connect the motorized drive assembly 30 to the connection assembly 500 with the electrical cable 532. The motorized drive assembly 30 can also include a circuit associated with the port. The circuit is configured such that when a device is electrically connected to the port, the circuit can close (or be complete), and when a device is not electrically connected to the port, the circuit remains open (or is incomplete). In the present embodiment, the circuit can close in response to the steering assembly 100 being electrically connected to the wheelchair 10 and associated motorized drive assembly 30 through the connection assembly 500. More specifically, in response to the first and second electrical connectors 320, 528 selectively engaging, the circuit can close, indicating that the steering assembly 100 is electrically connected to the wheelchair 10. In the illustrated embodiment, the circuit is an analog circuit. In other embodiments, the circuit can be a digital circuit. In other examples of embodiments, the control system 600 can utilize alternative system to determine whether the steering assembly 100 is attached to the wheelchair 10. For example, the steering assembly 100 can include a magnet, a Hall effect sensor, or any other system or sensor suitable for detection of attachment (or detachment) of the steering assembly 100 to the wheelchair 10. Accordingly, in embodiments where an electrical connection is a wireless connection, an additional sensor (e.g., Hall effect sensor, magnet, etc.) can be used to detect attachment (or detachment) of the steering assembly 100 to the wheelchair 10. As such, the term electrical connection herein can include a directed electrical connection or alternatively a wireless electrical connection in combination with a suitable sensor for detecting attachment/detachment of the steering assembly 100 to the wheelchair 10.

If the steering assembly 100 is not detected as attached to the wheelchair 10 (e.g., the circuit remains open), or "no" in FIG. 16, the control system proceeds to step 612. If the steering assembly 100 is detected as attached to the wheelchair 10 (e.g., the circuit is closed), or "yes" in FIG. 16, the control system proceeds to step 616.

At step 612, the control system 600 does not detect the steering assembly 100 as being attached to the wheelchair 10 (for example, as illustrated in FIG. 14). The circuit associated with the motorized drive assembly is open (or not complete), indicating no device is electrically connected to the port. In response to the steering assembly 100 not being attached to the wheelchair 10, the control system 600 enables operation of the motorized drive assembly 30 in a first configuration. Stated another way, the control system 600 enables a first operation configuration on the motorized drive assembly 30, or the motorized drive assembly 30 is configured to operate in a first configuration. In the first configuration, a first operational mode is enabled. For example, a first maximum speed of the motorized drive assembly 30 can be enabled. As another example, a first rate of acceleration of the motorized drive assembly 30 can be enabled. As another example, a first traction management condition of the motorized drive assembly 30 can be enabled. Traction management condition includes measuring an acceleration of the motor of the motorized drive assembly 30, measuring the load on the motor of the motorized drive assembly 30, and/or measuring the acceleration of the motorized drive assembly 30 itself. Based on analysis of these measurements, a determination is made to as to whether the motor of the motorized drive assembly 30 is losing traction, and if the motor is losing traction, what actions can occur to regain traction. The actions can include slowing the motor of the motorized drive assembly 30 until an increase in load on the motor of the motorized drive assembly 30 is measured, or slowing the motor of the motorized drive assembly 30 until an increase in acceleration of the motorized drive assembly 30 is measured. In other embodiments, the first configuration can include enabling a plurality of operational modes, including combinations (or all) of the first maximum speed, first rate of acceleration, and/or first traction management condition. Once the first operational configuration is enabled, the control system 600 returns to step 608 to detect whether the steering assembly 100 becomes attached to the wheelchair 10 (or continues to be detached from the wheelchair 10).

At step 616, the control system 600 does detect the steering assembly 100 as being attached to the wheelchair 10 (for example, as illustrated in FIG. 15). The circuit associated with the motorized drive assembly is closed (or complete), indicating the steering assembly 100 is electrically connected to the port. In response to the steering assembly 100 being attached to the wheelchair 10, the control system 600 enables operation of the motorized drive assembly 30 in a second configuration. Stated another way, the control system 600 enables a second operation configuration on the motorized drive assembly 30, or the motorized drive assembly 30 is configured to operate in a second configuration. The second configuration is different than the first configuration. In the second configuration, a second operational mode is enabled. For example, a second maximum speed of the motorized drive assembly 30 can be enabled. The second maximum speed is different than the first maximum speed. As an example, the second maximum speed is greater (or faster) than the first maximum speed, as attachment of the steering assembly 100 facilitates (or allows) for a greater top speed of the wheelchair 10. Thus, the second maximum speed (or second speed) allows the motorized drive assembly 30 to drive the wheelchair 10 at a speed greater than the first maximum speed (or first speed). The second maximum speed can be the maximum output speed of the motorized drive assembly 30, while the first maximum speed can be lower than the maximum output speed of the motorized drive assembly 30. More specifically, the first maximum speed can be between 10% to 90% less than the second maximum speed. Stated another way, the first maximum speed can be approximately 0.5 miles per hour (mph) to approximately 5.5 mph, and the second maximum speed can be approximately 0.5 mph to a speed greater than 5.5 mph. In other embodiments, the second maximum speed can be less than the first maximum speed. As another example, a second rate of acceleration of the motorized drive assembly 30 can be enabled. The second rate of acceleration is different than the first rate of acceleration. As an example, the second rate of acceleration is greater (or faster) than the first rate of acceleration, as attachment of the steering assembly 100 facilitates (or allows) for a greater rate of acceleration of the wheelchair 10. Thus, the second rate of acceleration (or second acceleration rate) allows the motorized drive assembly 30 to drive the wheelchair 10 at a faster rate of acceleration than the first rate of acceleration (or first acceleration rate). The second rate of acceleration can be the maximum output acceleration of the motorized drive assembly 30, while the first rate of acceleration can be lower than the maximum output acceleration of the motorized drive assembly 30. More specifically, the first rate of acceleration can be between 10% to 90% less than the second rate of acceleration. Stated another way, the first rate of acceleration can be approximately 0.1 miles per hour per second (mph/s) to approximately 1.36 mph/s, and the second rate of acceleration can be approximately 0.1 mph/s to a rate of acceleration greater than 1.36 mph/s. In other embodiments, the second rate of acceleration can be less than the first second rate of acceleration. As another example, a second traction management condition of the motorized drive assembly 30 can be enabled. The second traction management condition is different than the first traction management condition, as the steering assembly 100 facilitates (or allows) for greater stability of the wheelchair 10. Thus, the second traction management condition can have a different threshold for establishing a loss of traction than the first traction management condition. The second traction management condition can also have a different thresholds as to how a rate of slowing the motor of the motorized drive assembly 30 until an increase in load on the motor of the motorized drive assembly 30 is measured, a rate of slowing the motor of the motorized drive assembly 30 until an increase in acceleration of the motorized drive assembly 30 is measured, or a rate of speed increase of the motor of the motorized drive assembly 30 once traction is restored, as compared to the first traction management condition. It should also be considered that the rates of slowing the motor and the rate of speed increase of the motor in either the first or second traction management conditions can be adjustable or programmable. Thus, the second operational configuration is different than the first operational configuration. In other embodiments, the second configuration can include enabling a plurality of operational modes, including combinations (or all) of the second maximum speed, second rate of acceleration, and/or second traction management condition. Once the second operational configuration is enabled, the control system 600 returns to step 608 to detect whether the steering assembly 100 becomes detached from the wheelchair 10 (or maintains attachment to the wheelchair 10).

Figure 17:
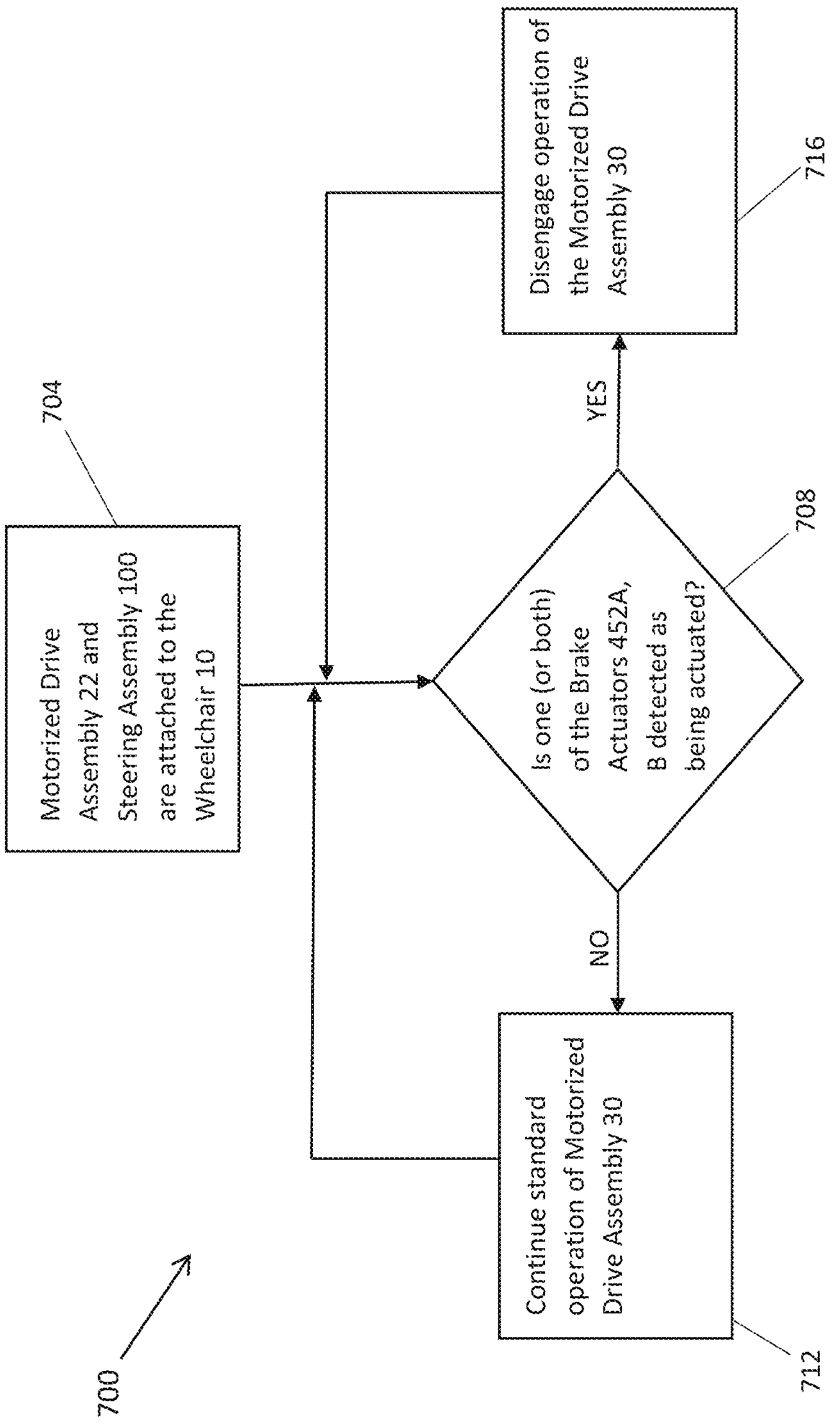
FIG. 17 is a flowchart of an electronic brake system for use with the motorized drive assembly and steering assembly of FIG. 8.

FIG. 17 illustrates an example of an electronic braking system or application 700 that detects actuation of one or both of the brake actuators 452A, B of the steering assembly 100. The electronic braking system 700 can supplement the brake 424 by disengaging (or slowing) the motorized drive assembly 30 to facilitate stopping of the wheelchair 10.

The electronic braking system 700 can be a module that operates on the motorized drive assembly 30. In other embodiments, the electronic braking system 700 can be distributed (i.e. operates on a remote server or from a remote location) and is in communication with the motorized drive assembly 30. For example, the electronic braking system 700 can operate on a remote computing device (e.g., a mobile phone, tablet computer, etc.) that is in communication with the motorized drive assembly 30. The communication can be through any suitable wireless connection, Bluetooth, a local area network, generally over the Internet, etc. The electronic braking system 700 includes a series of processing instructions or steps that are depicted in flow diagram form.

Referring to FIG. 16, the electronic braking system 700 begins at step 704, where the motorized drive assembly 30 is mounted to the wheelchair 10. In the illustrated embodiments, the motorized drive assembly 30 is attached to the rear axle 34*a* of the wheelchair 10. In addition to the physical (or mechanical) attachment of the wheelchair, the motorized drive assembly 30 is electrically connected to the connection assembly 500, for example by electrical cable 532. In addition, the steering assembly 100 is attached to the wheelchair 10 and is electrically connected to the motorized drive assembly 30.

Next, at step 708, the electronic braking system 700 detects whether one (or both) of the brake actuators 452A, B have been actuated, indicating the user is attempting to engage the brake 424. The brake actuators 452A, B are in communication with the motorized drive assembly 30, for example by the throttle cable 468 (or a portion thereof), or a separate cable. If the brake actuators 452A, B are not detected as being actuated by the user, or "no" in FIG. 17, the electronic braking system 700 proceeds to step 712. If the brake actuators 452A, B are detected as being actuated by the user, or "yes" in FIG. 17, the electronic braking system 700 proceeds to step 716.

At step 712, the electronic braking system 700 does not detect actuation of one (or both) of the brake actuators 452A, B. Since the user is not attempting to brake (or use the brake 424), the motorized drive assembly 30 continues with standard operation. For example, the motorized drive assembly 30 will respond to the throttle 456. Stated another way, as the user actuates (or depresses) the throttle 456, the motorized drive assembly 30 will operate to propel the wheelchair 10. The electronic braking system 700 then returns to step 708 to detect whether one (or both) of the brake actuators 452A, B are actuated.

At step 716, the electronic braking system 700 does detect actuation of one (or both) of the brake actuators 452A, B. Since the user is attempting to brake (or use the brake 424), operation of the motorized drive assembly 30 is disengaged (or discontinued). By terminating operation of the motorized drive assembly 30 such that the motorized drive assembly 30 no longer propels the wheelchair 10, the motorized drive assembly 30 is supplementing the brake 424 to slow (or stop) the wheelchair 10. In addition, or alternatively, once actuation of the one (or both) brake actuators 452A, B is detected, the motorized drive assembly 30 will temporarily not respond to the throttle 456. Stated another way, as the user actuates (or depresses) the throttle 456 concurrently with one (or both) of the brake actuators 452A, B, the throttle 456 will not operate the motorized drive assembly 30. By disengaging operation of the motorized drive assembly 30, and/or the throttle 456, the electronic braking system 700 supplements operation of the brake 424 to slow (or stop) the wheelchair 10. The electronic braking system 700 then returns to step 708 to detect whether one (or both) of the brake actuators 452A, B are actuated (or are continued to be actuated). Once the electronic braking system 700 detects that the brake actuators 452A, B are no longer actuated, operation of the motorized drive assembly 30 and throttle 456 resumes (i.e., the electronic braking system 700 proceeds to step 712). It should be appreciated that the control system 600 and the electronic braking system 700 can operate separately or concurrently. Accordingly, in one or more examples of embodiments of the steering assembly 100 and/or the motorized drive assembly 30, the control system 600 can be present, the electronic braking system 700 can be present, or both the control system 600 and the electronic braking system 700 can be present.

FIGS. 1-17 depict aspects of a steering assembly 100 that is illustrated as a passive, or non-motorized add on to the wheelchair 10. The steering assembly 100 is configured to cooperate with the motorized drive assembly 30 to provide steering functionality and drive functionality to the associated wheelchair 10. In the illustrated embodiments, the motorized drive assembly 30 effectively provides a rear-wheel drive to the wheelchair 10. However, in other embodiments, the steering assembly 100 can be an active add-on (otherwise referred to as a driven add-on). Stated another way, the steering assembly 100 can incorporate an active drive system that is configured to drive the front wheel assembly 412. In these embodiments, the active steering assembly 100 provides front-wheel drive to the wheelchair 10. The active steering assembly 100 can operate alone, or in combination with the motorized drive assembly 30 to provide both front and rear wheel drive capabilities to the wheelchair 10. As such, the control system 600 and the electronic braking system 700 can be used in association with an active steering assembly 100, in addition to the passive steering assembly 100.

One or more aspects of the steering assembly 100 provides certain advantages. For example, the control system 600 is configured to detect attachment of the steering assembly 100 to the wheelchair 10 (and the associated motorized drive assembly 30). In response to not detecting attachment of the steering assembly 100 to the wheelchair 10, the control system 600 can enable a first operation configuration on the motorized drive assembly 30. The first operational configuration can include a first maximum speed, a first rate of acceleration, and/or a first traction management condition. In response to detecting attachment of the steering assembly 100 to the wheelchair 10, the control system 600 can enable a second operation configuration on the motorized drive assembly 30. The second operational configuration can include a second maximum speed, a second rate of acceleration, and/or a second traction management condition. Thus, the second operational configuration is different than the first operational configuration. More specifically, the second operational configuration can facilitate operation of the motorized drive assembly 30 at a greater speed, greater rate of acceleration, and/or a different tractional management condition when the steering assembly 100 is detected as attached to the wheelchair 10, as compared when the steering assembly 100 is detected as not attached to the wheelchair 10. As another example, the electronic braking system 700 is configured to detect actuation of one (or both) of the brake actuators 452A, B. In response to detection of one (or both) of the brake actuators 452A, B, the electronic braking system 700 can temporarily suspend operation of the motorized drive assembly 30 and/or operation of the throttle 456. By temporarily suspending operation of the motorized drive assembly 30 and/or operation of the throttle 456, the motorized drive assembly 30 supplements operation of the brake 424 to slow (or stop) the wheelchair 10. These and other advantages are realized by the disclosure provided herein.

What is claimed is:

1. A wheelchair comprising:

a steering assembly configured to selectively attach to the wheelchair, the steering assembly including:

a steering member;

a front wheel operably connected to the steering member;

a frame assembly configured to carry the steering member and the front wheel; and a mounting assembly coupled to the frame assembly; and a drive assembly coupled to the wheelchair at a position between a pair of rear wheels of the wheelchair, wherein the drive assembly is configured to operate in a first configuration in response to the steering assembly being detached from the wheelchair, wherein the drive assembly is configured to operate in a second configuration in response to the steering assembly being attached to the wheelchair, wherein in the first configuration, the drive assembly drives the wheelchair at a first rate of acceleration, and wherein in the second configuration, the drive assembly drives the wheelchair at a second rate of acceleration different than the first rate of acceleration.

2. The wheelchair of claim 1, wherein in the first configuration, the drive assembly drives the wheelchair at a first speed, and wherein in the second configuration, the drive assembly drives the wheelchair at a second speed different than the first speed.

3. The wheelchair of claim 1, wherein the mounting assembly includes an electrical connector, and wherein in response to the steering assembly being attached to the wheelchair, the electrical connector is in electrical communication with the drive assembly.

4. The wheelchair of claim 3, wherein the electrical connector is in electrical communication with a first actuator positioned on the steering assembly.

5. The wheelchair of claim 4, wherein in response to actuation of the first actuator, the drive assembly detects a signal from the electrical connector and operates in the second configuration.

6. The wheelchair of claim 5, wherein in the first configuration, the drive assembly drives the wheelchair at a first speed, and wherein in the second configuration, the drive assembly drives the wheelchair at a second speed different than the first speed.

7. The wheelchair of claim 1, wherein the drive assembly is coupled to a mounting member of the wheelchair.

8. The wheelchair of claim 7, wherein the steering assembly is configured to selectively attach to the mounting member of the wheelchair.

9. A wheelchair comprising:

a steering assembly configured to selectively attach to the wheelchair, the steering assembly including:

a steering member;

a front wheel operably connected to the steering member;

a frame assembly configured to carry the steering member and the front wheel;

a brake operably connected to the front wheel;

at least one brake actuator operably connected to the brake; and a mounting assembly coupled to the frame assembly; and a drive assembly removably coupled to the wheelchair, wherein in response to actuation of the brake actuator, the drive assembly is configured to temporarily disengage operation, wherein the drive assembly is configured to operate in a first configuration in response to the steering assembly being detached from the wheelchair, wherein the drive assembly is configured to operate in a second configuration in response to the steering assembly being attached to the wheelchair, wherein in the first configuration, the drive assembly drives the wheelchair at a first speed, and wherein in the second configuration, the drive assembly drives the wheelchair at a second speed greater than the first speed.

10. The wheelchair of claim 9, the steering assembly including a throttle in communication with the drive assembly and configured to operate the drive assembly, wherein in response to actuation of the brake actuator, the throttle is configured to temporarily disengage communication with the drive assembly.

11. The wheelchair of claim 9, wherein the steering assembly including a throttle in communication with the drive assembly and configured to operate the drive assembly.

12. The wheelchair of claim 9, wherein the drive assembly is removably coupled to a mounting member of the wheelchair.

13. The wheelchair of claim 12, wherein the steering assembly is configured to selectively attach to the mounting member of the wheelchair.

14. The wheelchair of claim 9, wherein in the first configuration, the drive assembly drives the wheelchair at a first rate of acceleration, and wherein in the second configuration, the drive assembly drives the wheelchair at a second rate of acceleration different than the first rate of acceleration.

15. The wheelchair of claim 9, wherein the mounting assembly includes an electrical connector, and wherein in response to the steering assembly being attached to the wheelchair, the electrical connector is in electrical communication with the drive assembly.

16. The wheelchair of claim 15, wherein the electrical connector is in electrical communication with a throttle positioned on the steering assembly.

17. The wheelchair of claim 15, wherein in response to actuation of a throttle, the drive assembly detects a signal from the electrical connector and operates in the second configuration.

18. A wheelchair comprising:

a steering assembly configured to selectively attach to the wheelchair, the steering assembly including:

a steering member;

a front wheel operably connected to the steering member;

a frame assembly configured to carry the steering member and the front wheel;

a brake operably connected to the front wheel;

at least one brake actuator operably connected to the brake; and a mounting assembly coupled to the frame assembly; and a drive assembly removably coupled to the wheelchair, wherein in response to actuation of the brake actuator, the drive assembly is configured to temporarily disengage operation, wherein the drive assembly is configured to operate in a first configuration in response to the steering assembly being detached from the wheelchair, and wherein the drive assembly is configured to operate in a second configuration in response to the steering assembly being attached to the wheelchair, wherein in the first configuration, the drive assembly drives the wheelchair at a first rate of acceleration, and wherein in the second configuration, the drive assembly drives the wheelchair at a second rate of acceleration different than the first rate of acceleration.

19. The wheelchair of claim 18, the steering assembly including a throttle in communication with the drive assembly and configured to operate the drive assembly, wherein in response to actuation of the brake actuator, the throttle is configured to temporarily disengage communication with the drive assembly.

20. The wheelchair of claim 18, wherein the steering assembly including a throttle in communication with the drive assembly and configured to operate the drive assembly.

21. The wheelchair of claim 18, wherein the drive assembly is removably coupled to a mounting member of the wheelchair.

22. The wheelchair of claim 21, wherein the steering assembly is configured to selectively attach to the mounting member of the wheelchair.

23. The wheelchair of claim 18, wherein the mounting assembly includes an electrical connector, and wherein in response to the steering assembly being attached to the wheelchair, the electrical connector is in electrical communication with the drive assembly.

24. The wheelchair of claim 23, wherein the electrical connector is in electrical communication with a throttle positioned on the steering assembly.

25. The wheelchair of claim 23, wherein in response to actuation of a throttle, the drive assembly detects a signal from the electrical connector and operates in the second configuration.

* * * * *